(12) United States Patent
Ikeno et al.

(10) Patent No.: US 7,688,477 B2
(45) Date of Patent: Mar. 30, 2010

(54) IMAGE READING APPARATUS, AND METHOD FOR DETECTING SIZE OF DOCUMENT

(75) Inventors: Takahiro Ikeno, Seto (JP); Yoshinori Osakabe, Seto (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 812 days.

(21) Appl. No.: 11/557,570

(22) Filed: Nov. 8, 2006

(65) Prior Publication Data

US 2007/0103735 A1 May 10, 2007

(30) Foreign Application Priority Data

Nov. 8, 2005 (JP) ............................. 2005-324182

(51) Int. Cl.
*H04N 1/04* (2006.01)
(52) U.S. Cl. ...................... 358/449; 358/474; 358/486; 358/488
(58) Field of Classification Search ................ 358/449, 358/474, 486, 488, 497
See application file for complete search history.

(56) References Cited

U.S. PATENT DOCUMENTS 6,937,369 B2 * 8/2005 Shih et al. ................... 358/486

7,221,487 B2 * 5/2007 Sesek et al. .................. 358/488
7,420,717 B2 * 9/2008 Park ........................... 358/474

FOREIGN PATENT DOCUMENTS

| JP | 55-164844 A | 12/1980 |
| JP | 59-184802 A | 10/1984 |
| JP | 5-130337 A | 5/1993 |
| JP | 3014474 U | 5/1995 |
| JP | 2000-232562 A | 8/2000 |
| JP | 2001-066712 A | 3/2001 |

* cited by examiner

*Primary Examiner*—Houshang Safaipour
(74) *Attorney, Agent, or Firm*—Baker Botts L.L.P.

(57) ABSTRACT

A first positioning member is provided on a document table to extend in a first scanning direction and determines a position in a second scanning direction of an edge of a document placed on the placing surface. A first reference area holding member extends from a first positioning member over the placing surface and holds, on its surface opposing the placing surface, two reference areas extending parallel to the first scanning direction and including a first and second reference areas each having a different pattern from each other. A border position in the first scanning direction between at least one of the first and second reference areas and the document is detected, based on a received light quantity of reflected light. A size determining unit calculates a document length in the first scanning direction based on the detected border position.

21 Claims, 16 Drawing Sheets

F I G. 10
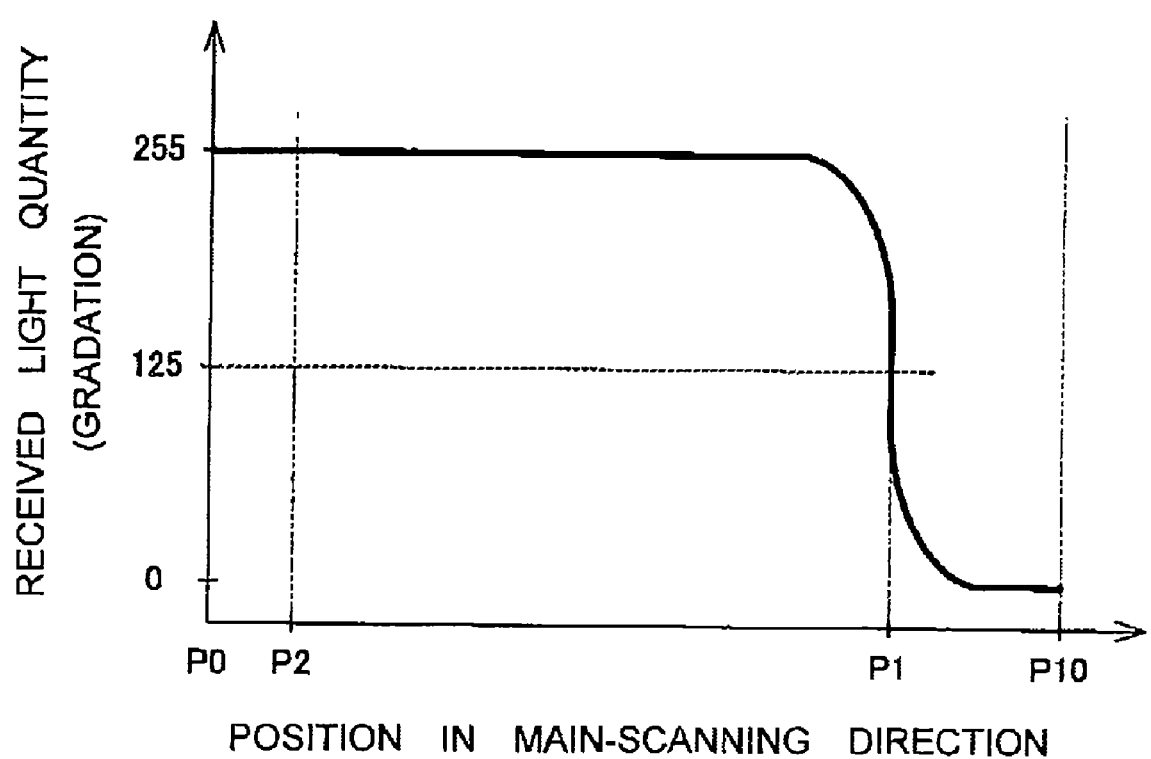

F I G. 12
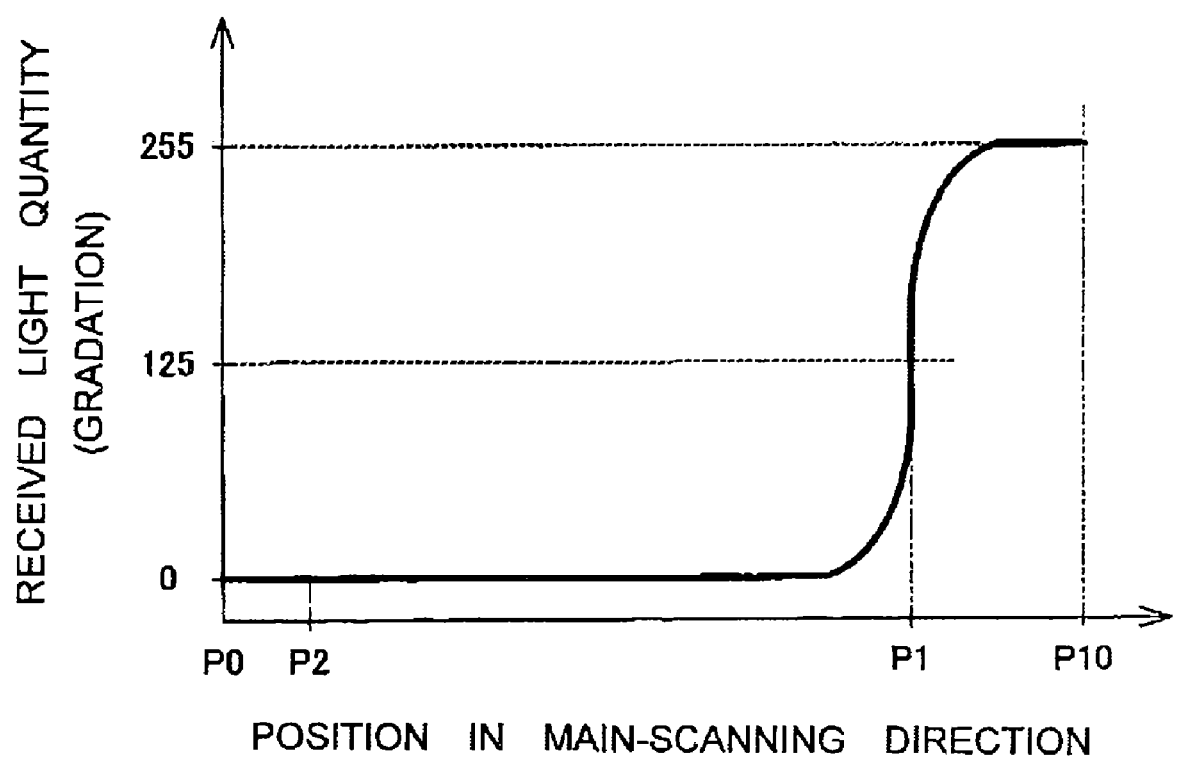

F I G. 13
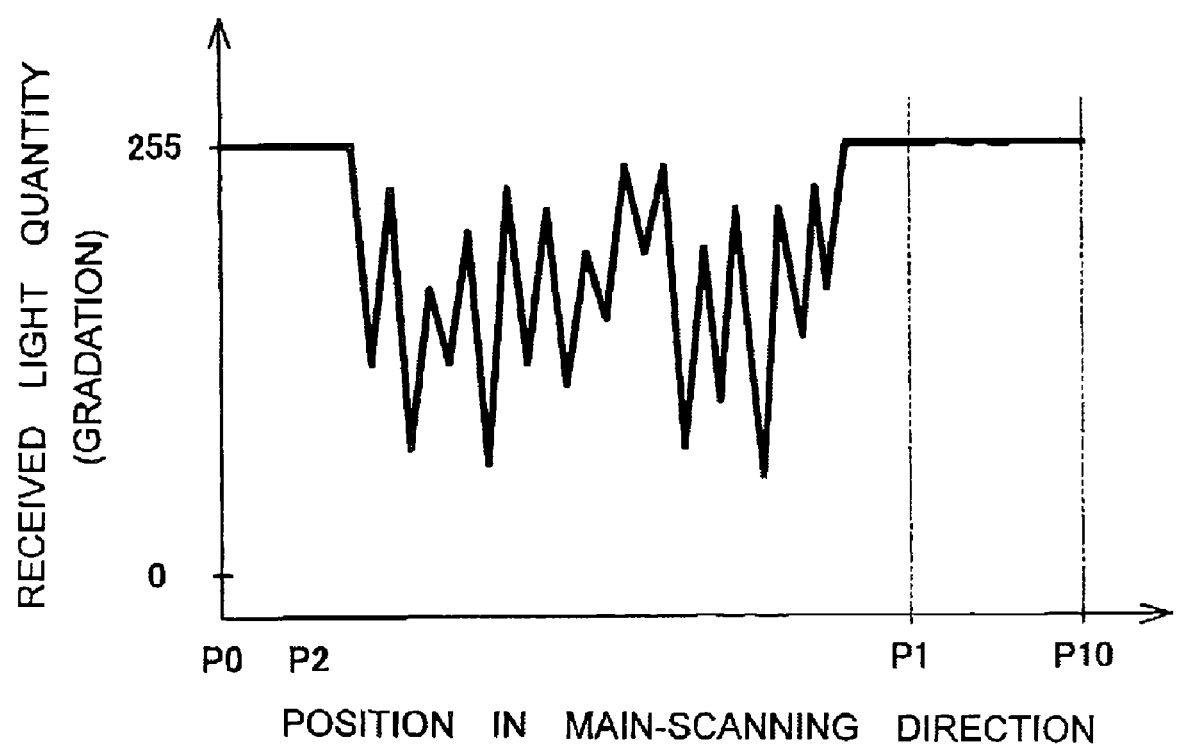

IMAGE READING APPARATUS, AND METHOD FOR DETECTING SIZE OF DOCUMENT

CROSS-REFERENCE TO RELATED APPLICATIONS

This Nonprovisional application claims priority under 35 U.S.C. §119(a) on Patent Application No. 2006-324182 filed in Japan on Nov. 8, 2005, the entire contents of which are hereby incorporated by reference.

BACKGROUND OF THE INVENTION

1. Field of the Invention

The present invention relates to a method for detecting a size of a document and an image reading apparatus for reading an image on a document placed on a document table, and more particularly to a processing technique for calculating a size of the document based on image data thus read.

2. Description of Related Art

When the image reading apparatus reads the image on the document, first, the document is placed on a contact glass (placing surface) provided on the document table. At this time, the document is placed on the contact glass, so that an image-recorded surface faces the contact glass. Next, a document cover is closed. As a result, the document is sandwiched between a pressing surface of the document cover and the contact glass, thereby being fixed on the contact glass. In this state, when a reading instruction is inputted to the image reading apparatus, the image on the document is read by an image sensor disposed so as to face the document through the contact glass.

As such an image reading apparatus, the one having a function to detect the size of the document placed on the contact glass is well known. As a detection technique of a document size, for example, there is a method disclosed in Japanese Patent Application Laid-Open No. 2000-232562. Namely, in the image reading apparatus disclosed in Japanese Patent Application Laid-Open No. 2000-232562, a document cover having a particular pattern drawn on the pressing surface is provided. The image sensor reads the image, with the document pressed by this document cover. Then, by detecting portions corresponding to the aforementioned pattern from the image data read by the image sensor, the size of the document is detected. However, in this detection technique, when the image on a transparent or semi-transparent document is read, the pattern drawn on the pressing surface of the document cover is also simultaneously read by the image sensor. Therefore, in some cases, the size of the transparent or semi-transparent document can not be detected. Meanwhile, Japanese Patent Application Laid-Open No. 2001-66712 discloses the image reading apparatus capable of detecting the size of the document without a deterioration of an image quality for either document of the transparent or semi-transparent document.

In the image reading apparatus disclosed in Japanese Patent Application Laid-Open No. 2001-66712, a document table is adopted, which has a belt-shaped pattern provided so as to overlap with an image non-forming area of the document when the document is placed on the contact glass. The image non-forming area is subjected to image reading, but image data read therefrom is not used for image forming. The document is inserted and placed between the contact glass and the aforementioned pattern, and in this state, the image of the document is read. Then, by determining whether or not the aforementioned pattern is included in the image data thus read, an edge of the document is detected, and the size of the document is thereby recognized.

However, in the conventional detection method of the document size disclosed in the above-described Japanese Patent Application Laid-Open No. 2001-66712, the size of the document is detected using only one belt-shaped pattern. Accordingly, for example, when the document has a background similar to the belt-shaped pattern, it is impossible to discriminate between a margin of the edge portion of the document and the belt-shaped pattern included in the read image data, thus making it impossible to recognize the document size.

BRIEF SUMMARY OF THE INVENTION

In view of the above-described circumstances, the present invention is provided, and an object of the present invention is to provide a method for detecting a size of a document and an image reading apparatus capable of improving a detection accuracy of a document size.

According to one aspect of the invention, an image reading apparatus that reads an image in a first scanning direction and in a second scanning direction perpendicular to the first scanning direction is characterized as follows. The image reading apparatus comprises a document table that has a placing surface on which a document is placed; a first positioning member that is provided on the document table to extend in the first scanning direction and determines a position in the second scanning direction of an edge of the document placed on the placing surface; and a light receiving unit that is provided to face one surface of the document placed on the placing surface, and receives reflected light of light emitted to the placing surface. Also, the image reading apparatus comprises a first reference area holding member that extends from the first positioning member over the placing surface and holds, on its surface opposing the placing surface, two reference areas extending parallel to the first scanning direction and including a first reference area and a second reference area each having a different pattern from each other; and a border position detecting unit that detects a border position in the first scanning direction between at least one of the first and second reference areas and the document placed on the placing surface, based on a light quantity of the reflected light received by the light receiving unit. Moreover, the image reading apparatus comprises a size determining unit that calculates a document length in the first scanning direction based on the border position detected by the border position detecting unit.

According to the above described one aspect of the image reading apparatus of the present invention, a document is set on the placing surface such that a second scanning directional edge of the document is in contact with the first positioning member. At this time, the edge of the document is placed below the first reference area holding member. When an image reading instruction is inputted, reflected light reflected from the document is received by the light receiving unit. The received light quantity of the reflected light changes depending on a pattern of a reference area and an image on the document. Accordingly, a border position between at least one of the first and second reference areas and the document in the first scanning direction can be detected from the received light quantity of the reflected light. When the border position is detected, the size of the document in the first scanning direction can be obtained.

In addition, two reference areas each having a different pattern from each other (for example, black and white) are provided. Accordingly, when the border position with respect to the first reference area having a particular pattern can not be detected, it is possible to detect the border position with respect to the second reference area having a different pattern from the first reference area.

The image reading apparatus may further comprise a second positioning member that is provided on the document table to extend in the second scanning direction and determines a position in the first scanning direction of an edge of the document placed on the placing surface, and a second reference area holding member that extends from the second positioning member over the placing surface and holds, on its surface opposing the placing surface, two reference areas extending parallel to the second scanning direction and including a third reference area and a forth reference area, the third reference area having the same pattern as the first reference area, and the fourth reference area having the same pattern as the second reference area. Then, the border position detecting unit detects a border position in the second scanning direction between at least one of the third and fourth reference and the document placed on the placing surface, based on the light quantity of the reflected light received by the light receiving unit, and the size determining unit calculates a document length in the second scanning direction based on the border position in the second scanning direction detected by the border position detecting unit.

With the above-described construction, a border position in the second scanning direction between the document and at least one of two reference area can be detected accurately in a similar manner to the border detection in the first scanning direction. Based on the border position, the size of the document in the second scanning direction is accurately calculated.

Alternatively, the image reading apparatus may further comprise a document placing direction input unit that inputs a placing direction of the document placed on the placing surface; and a document size information storage unit that stores a correspondence for each document placing direction between document lengths in the first scanning direction and standard document sizes. Then, the size determining unit refers to the correspondence stored in the document size information storage unit and selects, as a document size, one of the standard document sizes that accords with the calculated document length in the first scanning direction and the inputted document placing direction.

With the above-described constitution, when the document placed on the placing surface has a standard size, an accurate document size can be quickly obtained, without calculating a document length in the second scanning direction.

Another aspect of the invention provides a method for detecting a size of a document to be read by an image reading apparatus that reads an image of a document placed on a placing surface of a document table in a first scanning direction and in a second scanning direction perpendicular to the first scanning direction. The method comprises the following steps. A position in the second scanning direction of an edge of a document placed on the placing surface is determined by a first positioning member that is provided on the document table to extend in the first scanning direction. Reflected light from the document placed on the placing surface and at least one of first and second reference areas that are provided to extend in the first scanning direction is received, while the document is placed between the placing surface and the first and second reference areas having different patterns from each other. A border position in the first scanning direction between the document placed on the placing surface and at least one of the first and second reference areas is detected, based on the received light quantity of the reflected light. Then, a document length in the first scanning direction is calculated based on the detected border position.

The method may further comprise the following steps. A position in the first scanning direction of an edge of the document placed on the placing surface is determined by a second positioning member that is provided on the document table to extend in the second scanning direction. Reflected light from the document placed on the placing surface and at least one of third and fourth reference areas that are provided to extend in the second scanning direction is received, while the document is placed between the placing surface and the third and fourth reference areas having different patterns from each other. A border position in the second scanning direction between the document placed on the placing surface and at least one of the third and fourth reference areas are detected, based on the received light quantity of the reflected light. Then, a document length in the second scanning direction is calculated based on the detected border position.

Alternatively, the method may further comprise the following steps. A placing direction of the document placed on the placing surface is inputted. By referring to document size information including a correspondence, for each document placing direction, between document lengths in the first scanning direction and standard document sizes, one of the standard document sizes is selected, as a document size, in accordance with the calculated document length in the first scanning direction and the inputted document placing direction.

With the above described method, a document length in the first scanning direction is calculated based on a border portion detected between the document placed in the placing surface and at least one of the first and second reference areas. A document length in the second scanning direction is calculated in a similar manner to the first scanning direction, or, for a document having a standard size, a corresponding standard document size is determined quickly according to the calculated length in the first scanning direction and the inputted document placing direction.

The above and further objects and features of the invention will more fully be apparent from the following detailed description with accompanying drawings.

BRIEF DESCRIPTION OF THE SEVERAL VIEWS OF THE DRAWINGS

FIG. 10 is a graph schematically showing a received light quantity distribution in the main-scanning direction of the read reflected light;

FIG. 12 is a graph schematically showing the received light quantity distribution in the main-scanning direction of the read reflected light;

FIG. 13 is a graph schematically showing the received light quantity distribution in the main-scanning direction of the read reflected light;

DETAILED DESCRIPTION OF THE PRESENT INVENTION

First Embodiment

Figure 1:
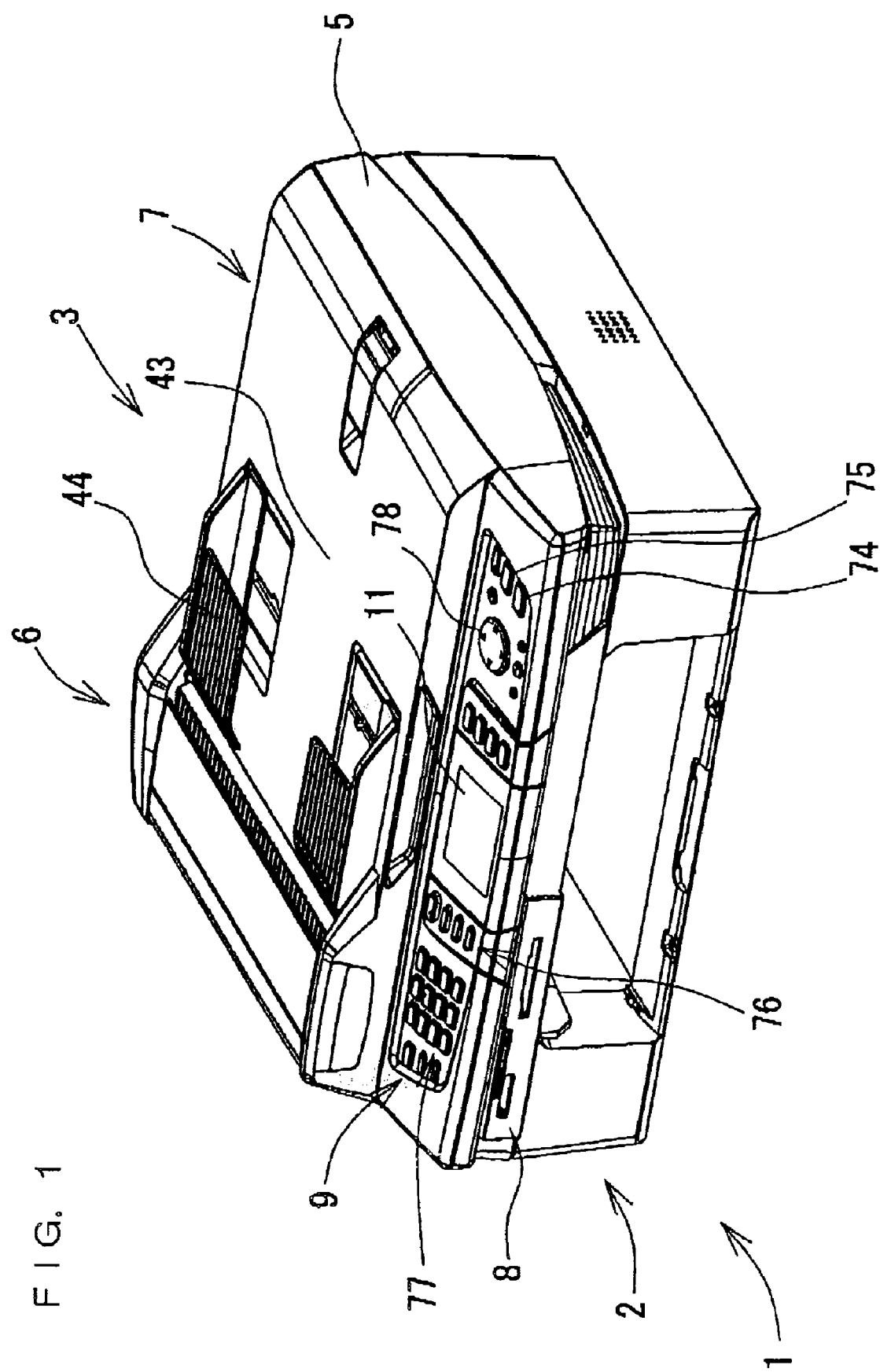
FIG. 1 is a perspective view showing an appearance of an external constitution of a multi-function device having a scanner unit, which is an example of an image reading apparatus of the present invention.

Hereafter, a first embodiment of the present invention will be explained with reference to the drawings as needed. FIG. 1 is a perspective view showing an appearance of a multi-function device 1 having a scanner unit 3, as an example of an image reading apparatus of the present invention.

The multi-function device (MFD) 1 is integrally formed with a printer unit 2 arranged in a lower portion, a scanner unit 3 arranged in an upper portion thereof, a document cover 7 arranged in the further upper portion of the scanner unit 3, an operation panel 9 arranged in a front side of an upper surface of the device 1, and a slot unit 8 arranged in front of the device 1, and has functions such as a printer function, scanner function, copy function and a facsimile function.

The multi-function device 1 is mainly connected to a computer (not shown), and has a function (printer function) to perform processing of recording an image and/or document on a recording paper in the printer unit 2, based on recording data including image data and/or document data transmitted from the computer. Also, the multi-function device 1 has functions such as a function (facsimile function) to perform processing of transferring the image data read by the scanner unit 3 to communication apparatus connected through telephone line, etc, and a function (scanner function) of performing processing of transferring the above image data to a recording apparatus such as a hard disk drive (HDD) or the aforementioned computer. Further, the multi-function device 1 has a so-called function (copy function) of performing copy process of the document, that is, the function of recording the image of the document read by the scanner unit 3 on the recording paper in the printer 2, without transmitting/receiving data between the multi-function device 1 and the computer.

As will be explained in detail, the present invention relates to a technique of detecting the size of the document read by the scanner unit 3. Accordingly, the aforementioned printer function, the copy function, and the facsimile function are optional functions in the present invention. This means that, for example, the present invention is applicable to a scanner apparatus alone having only the scanner function. Of course, not limited to the scanner apparatus alone, the present invention can be applied to the scanner unit provided in a copy machine to realize a copy function. Each element constituting the multi-function device 1 will be explained hereunder. However, the constitution of the multi-function device 1 as will be described hereunder is only an example of realizing the present invention, and the constitution can be suitably modified in a scope not departing from the gist of the present invention.

[Operation Panel]

An operation panel 9 for operating the printer unit 2 and the scanner unit 3 is provided on the front side of the upper surface of the multi-function device 1 and on the upper surface of front side of the scanner unit 3. The operation panel includes each kind of operating key and a liquid crystal display 11. The multi-function device 1 operates following an instruction inputted from the operation panel 9. The operating keys include a plurality of input keys such as a start button 74 for starting an operation of the printer unit 2 or the scanner unit 3, a stop button 75 for stopping the operation or completing a setting, a FAX button for selecting the facsimile function, a scanner button for selecting the scanner function, a mode selecting button 76 such as a copy button for selecting the copy function, a ten-key pad 77 for inputting the number of copies or reading resolution by the scanner unit 3 and a magnitude of the recording image by a magnification function, a cross key 78 for scrolling and selecting a title (item) of function information, setting information, and mode information, etc, displayed on the liquid crystal display 11, and other setting buttons.

By pressing down a predetermined button of the operation panel 9, predetermined input information is transmitted to a control unit 100 (see FIG. 7) of the multi-function device 1. Thus, the multi-function device 1 is controlled by the control unit 100, so as to be operated in accordance with the input information. For example, when the copy button is pressed down, the multi-function device 1 is set in a copy mode capable of performing copy operation. At this time, the current operation state of the multi-function device 1, an operation guide to a user, and setting information, etc, are displayed on the liquid crystal display 11. Specifically, a guide whether or not a both sides copy function is set and a guide whether or not a placing direction of the document (such as landscape direction or portrait direction) is set, are displayed on the liquid crystal display 11. In a second embodiment as will be described later, a setting guide of a placing direction of the document is displayed on the liquid crystal display 11, and by operating the ten-key pad 77 by the user and designating the placing direction of the document, the placing direction of the document is set and inputted. Accordingly, the liquid crystal display 11 and ten-key pad 77, etc, capable of realizing such a setting input, functions as a document placing direction input unit of the present invention.

[Slot Unit]

The slot unit 8 can be loaded with each kind of small-sized memory card, which is a recording medium, and is provided at a left upper portion in a front surface of the multi-function device 1. The multi-function device 1 reads the image data recorded in the small-sized memory card loaded in the slot unit 8, and allows the liquid crystal display of the operation panel 9 to display information on the image data thus read. Accordingly, the user can record a desired image on the recording paper by the printer unit 3, and an input therefore can be performed by the operation panel 9.

[Printer Unit]

According to the first embodiment, the printer unit 2 is constituted as an inkjet recording apparatus. Specifically, the printer unit 2 records a read image or an image in accordance with print data, by discharging ink drops by an inkjet system onto the recording paper conveyed from a recording paper cassette not shown. During recording the image, an inkjet recording head performs a sliding movement in a widthwise direction of the recording paper, and the recording paper is intermittently conveyed by synchronizing a timing with this slide movement. It should be noted that the printer 2 is not directly related for realizing the present invention, and therefore a detailed explanation here is omitted.

Note that the printer unit 2 is not limited to the one constituted as an inkjet recording apparatus. As other examples, the printer unit 2 may be constituted as a laser printer in which a toner is adhered to an electrostatic latent image formed on a photoreceptor by using laser beam and the toner thus adhered is further conveyed to the recording paper, or may be constituted as an analogue electrophotographic image forming apparatus. Further, the printer unit 2 may be constituted as an image forming apparatus of thermal system (called thermal printer) in which printing is performed by changing color of photosensitive paper sheet by applying heat treatment thereto.

[Document Cover]

As shown in FIG. 1, the document cover 7 has an ADF (Automatic Document Feeder) 6 for automatically performing continuous conveyance of the document to a document discharge tray 44 from a document tray 43 on which the document is placed, through a predetermined conveyance path. In the conveyance process by the ADF 6, while the document passes through the contact glass 13 (see FIG. 2) provided on the upper surface of the document table 5, the image reading unit 61 waiting below the contact glass 13 reads the image of the document. Note that since the ADF 6 is an optional constitution for realizing the present invention, a detailed explanation is omitted.

Figure 2:
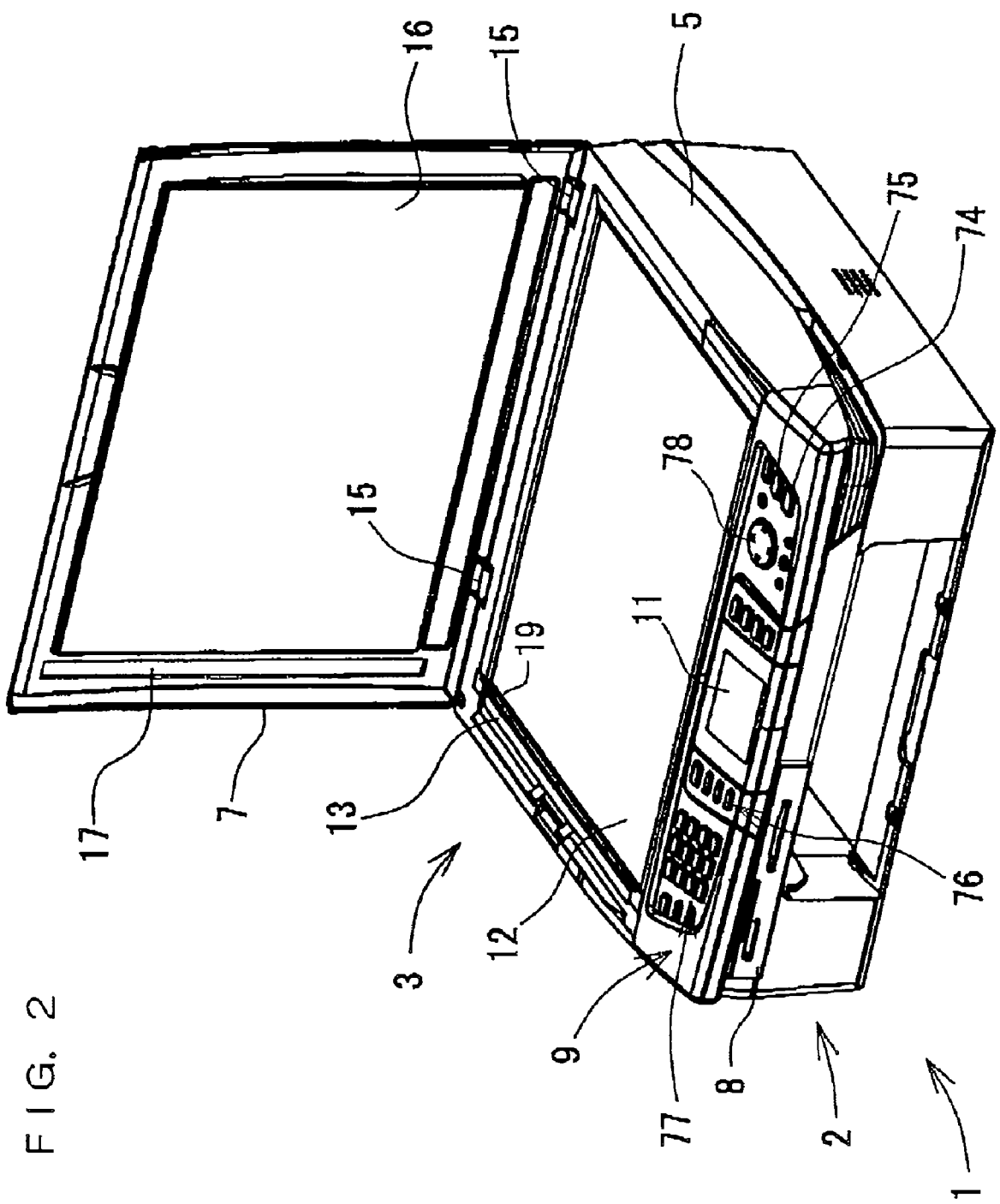
FIG. 2 is a perspective view showing a state in which a document cover is opened.

As shown in FIG. 2, a document pressing member 16 composed of sponge or a plate member, etc, is disposed on a bottom surface of the document cover 7, namely, on the surface facing the contact glass 12, to press down the document placed on the contact glass 12. A monochromatic white color is selected as the color of the document pressing member 16 over an entire region, to obtain a stable reflected light from the document, and to obtain from the region where no document is placed the reflected light similar to the reflected light from the white document sheet.

[Scanner Unit]

As shown in FIG. 1 and FIG. 2, in the first embodiment, the scanner unit 3 has a document table 5 that functions as a FBS (Flatbed Scanner). The document cover 7 having the ADF 6 is attached to this document table 5 through hinges 15 of backside, so as to be freely opened and closed.

The document table 5 has almost a rectangular body frame 63 (see FIG. 3), contact glasses 12 and 13 provided on the upper surface of the body frame 63 (see FIG. 2), and an image reading unit 61 provided inside of the body frame 63. In addition, the body frame 63 constitutes a part of the casing of the multi-function device 1. The contact glasses 12 and 13 are disposed on the upper surface of the document table 5 that faces the document cover 7. Accordingly, when the document cover 7 is opened, the contact glasses 12 and 13 are exposed as upper surfaces of the document table 5. Also, when the document cover 7 is closed, an entire portion of the upper surface of the document table 5 including the contact glasses 12 and 13 is covered with the document cover 7.

Figure 4:
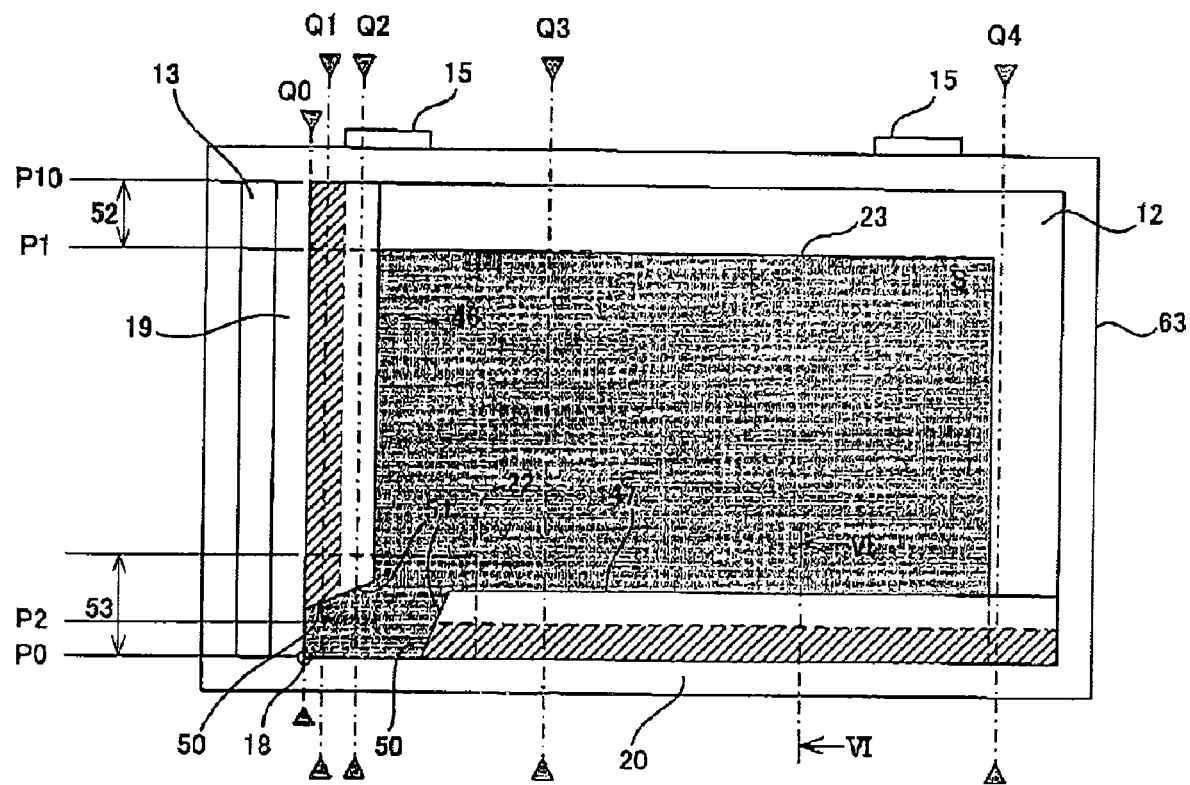
FIG. 4 is a plan view of an arrangement state of a contact glass arranged on an upper surface of the document table when the document is placed thereon, viewed from outside of an apparatus.
Figure 5:
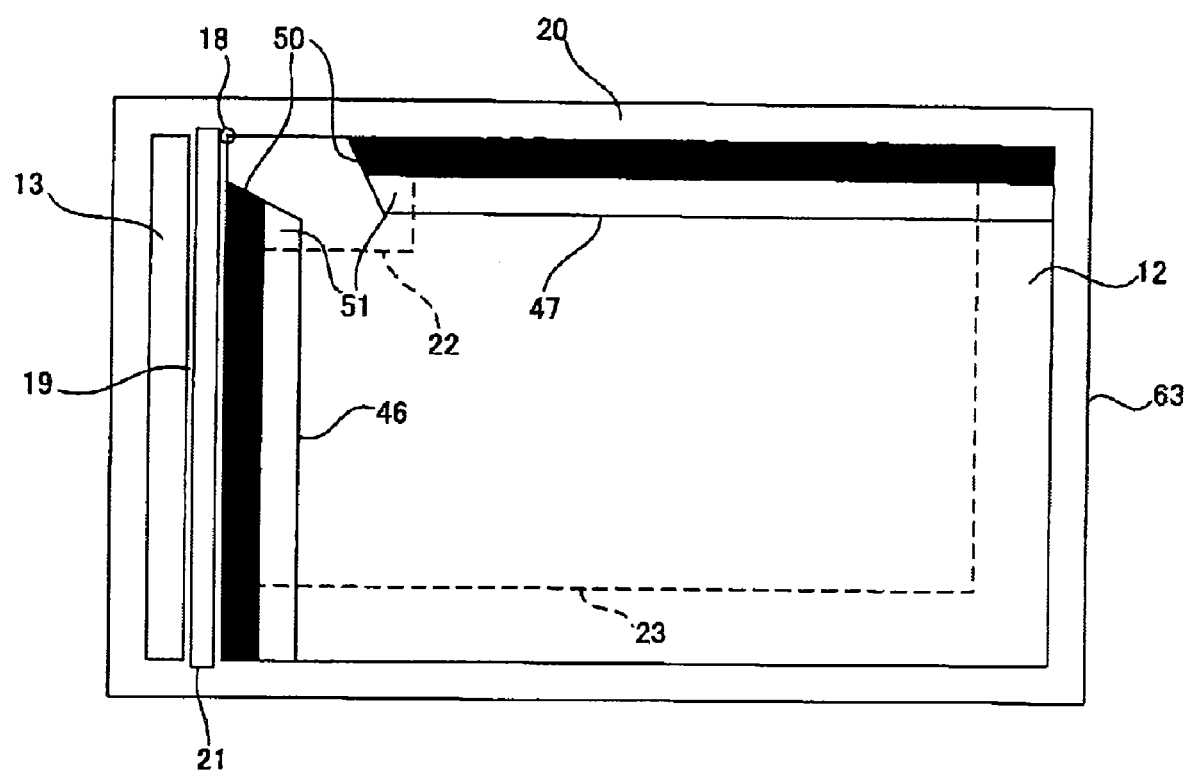
FIG. 5 is a plan view of the arrangement state of the contact glass arranged on the upper surface of the document table when the document is not placed thereon, viewed from an inside of the apparatus.

FIG. 4 and FIG. 5 are plan views showing an arrangement state of the contact glasses 12 and 13 arranged on the upper surface of the document table 6. In addition, FIG. 4 is a plan view showing a state of the contact glasses 12 and 13 viewed from the outside of the apparatus, when a document S is placed, and FIG. 5 is a plan view showing a state of the contact glasses 12 and 13 viewed from the inside of the apparatus, when the document S is not placed.

The contact glass 12 constitutes the placing surface on which the document is placed when the scanner unit 3 is used as the FBS, and is composed of a transparent glass plate, for example. The aforesaid contact glass 12 is fitted into the opening formed in the center and upper surface of the document table 5, so that the surface of the contact glass 12 is exposed to the outside. An overall area of the surface of the contact glass 12 becomes a document reading area in the FBS. In the multi-function device 1 of the first embodiment, the maximum size of the document that can be read by the scanner unit 3 is defined beforehand. Specifically, the maximum size of the document is generally determined by the image reading unit 61, the contact glass 12, or an apparatus scale, etc. Note that in the first embodiment, the maximum size of the document is set to A4 size (210×297 mm). Accordingly, the contact glass 12 having an area capable of placing the document of A4 size in the landscape direction, is used. Although it is needless to say, as described above, the maximum size of the document can be optionally changed in accordance with the image reading unit 61, the contact glass 12, or the device scale, etc.

The contact glass 13 constitutes a reading position for reading the image of the document while the document is conveyed by using the ADF 6, and is composed of a transparent glass plate, for example. As shown in FIG. 4, the contact glass 13 has a longitudinal plate-like shape with a length corresponding to the length in the main-scanning direction of the image reading unit 61, and is provided along a depth direction of the multi-function device 1.

As shown in FIG. 2 and FIG. 4, a positioning member 19 is arranged between the contact glasses 12 and 13 arranged on the upper surface of the document table 5. The positioning member 19 is a longitudinal plate-like member provided along the depth direction of the multi-function device 1 in the same way as the contact glass 13. By this positioning member 19, an end portion of the left side of the contact glass 12 on FIG. 4 is defined. The positioning member 19 is used as a reference of determining the placing position of the document, when the document is placed on the contact glass 12, which is a document placing surface in the FBS. As shown in FIG. 5, a white reference member 21 colored in white is provided on the backside of the positioning member 19, for acquiring white reference data used in a shading correction of an image signal.

In addition, as shown in FIG. 4, a positioning member 20 is provided on the upper surface of the body frame 63 on the front side of the contact glass 12. The positioning member 20 is a longitudinal plate-like member provided along a direction orthogonal to the depth direction of the multi-function device 1. By this positioning member 19, the end portion of the front side of the contact glass 12 is defined. The positioning member 20 is also used as a reference of determining the placing position of the document, when the document is placed on the contact glass 12. In the first embodiment, the positioning members 19 and 20 are integrally formed with the body frame 63 of the document table 5, and constitute a part of the body frame 63. In addition, as a modified example, it may be so constituted that the positioning members 19 and 20 are formed as separated members from the body frame 63, and by bonding or engagement, the positioning members 19 and 20 are attached to the upper surface of the body frame 63.

In the first embodiment, when the scanner unit 3 is used as the FBS, the document is placed, with an intersecting point of the positioning member 19 and the positioning member 20, namely, a front left side corner of the contact glass 12 set as a reference. Note that the aforementioned corner will be called "reference point 18" hereafter. More specifically, as shown in FIG. 4, the document is placed on the contact glass 12, so that any one of the corners of the document coincides with the reference point 18. On the upper surface of the positioning member 19, an end point from the reference point 18 of each kind of document size such as A4 (210×297 mm), B5 (182×257 mm), and A5 (148×210 mm) is marked, so that the size of the document in the main-scanning direction can be easily recognized by the user when the document is placed on the contact glass 12, with the reference point 18 set as a reference. Also, on the positioning member 20, the end point from the reference point 18 of each kind of document size such as A4, B5, and A5 is marked on its surface, so that the size of the document in the sub-scanning direction can be easily recognized by the user.

In addition, as shown in FIG. 4, on the positioning members 19 and 20, guides 46 and 47 (functioning as the reference area holding member) extended to the surface of the contact glass 12 is provided. The guide 46 is provided so as to extend in the depth direction of the apparatus along a left end portion of the contact glass 12. Note that the depth direction of the device 1 coincides with the main-scanning direction of CIS 67 as will be described later, and also coincides with the direction in which the document is positioned by the positioning member 19. Meanwhile, the guide 47 is provided so as to extend in the width direction of the apparatus along the front side end portion of the contact glass 12. Note that the width direction of the device 1 coincides with the sub-scanning direction of the CIS 67, and also coincides with the direction in which the document is positioned by the positioning member 20.

As shown in FIG. 4, both of the guides 46 and 47 are not provided in the vicinity of the reference point 18. This is because whether or not the document is placed on the contact glass 12 is detected by detecting the presence/absence of the edges of the guides 46 and 47. It is possible to determine and detect whether or not the document is placed, by acquiring a received light distribution in the main-scanning direction in a position shown by Q1 in FIG. 4, and determining whether or not there is a change point of the received light quantity in a document background area 53 in the distribution. Meanwhile, even when the document of a minimum size that can be read by the scanner unit 3 is placed on the contact glass 12, presence/absence of the document and its size must be detected. Therefore, the guides 46 and 47 are provided so as to intersect with a minimum size frame 22, which is an area (minimum size document placing area) in which the document of the minimum size is placed.

Also, even when document S of A4 size, which is a maximum size that can be read by the scanner unit 3, is placed on the contact glass 12, the presence/absence of the document S and its size must be detected. Therefore, the guides 46 and 47 are provided to extend from the minimum size frame 22 through the maximum size frame 23, which is the area (maximum size document placing area) in which the maximum size document S is placed, to the outside of the maximum size frame 23.

Figure 6:
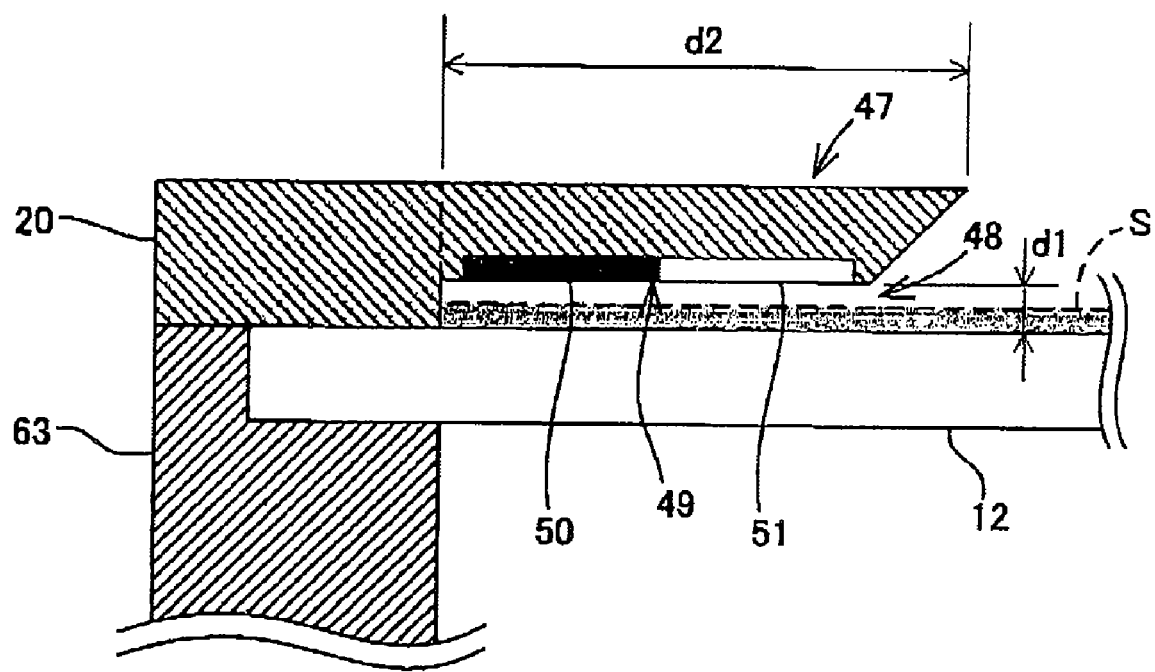
FIG. 6 is a schematic view of a section of a guide viewed from VI-VI line of FIG. 4.

FIG. 6 shows a schematic view of a section of the guide 47 viewed from the VI-VI line of FIG. 4. With reference to FIG. 6, the configuration of the guide 47 will be explained in detail hereunder. Note that the guide 46 has the same sectional configuration as that of the guide 47, and therefore the explanation thereof is omitted here.

As shown in FIG. 6, the guide 47 is integrally formed with the positioning member 20, and is molded with synthetic resin, etc, as a material, for example. The guide 47 extended to the surface of the contact glass 12 from the positioning member 20 is provided, so that a predetermined gap 48 is interposed between the guide 47 and the surface of the contact glass 12 disposed below, in other words, in a state of overhanging the contact glass 12. The document S placed on the contact glass 12 is inserted into the gap 48. Accordingly, the gap 48 is set as a width d1 into which at least the document S can be inserted, and is set at about 0.2 to 1.0 mm, for example. The edge of the document thus inserted into the gap 48 is pressed to the positioning member 20. Thus, the edge of the document is positioned. In addition, the tip of the guide 47 is inclined toward the positioning member 20 from an upper end to a lower end, thus making it easy to insert the document into the gap 48. Note that the guide 47 and the positioning member 20 are not necessarily integrally formed. Both of them may be formed as separate members, and the guide 47 may be attached to the positioning member 20 or the body frame 63.

On a surface 49 opposing the contact glass 12 of the guide 47, a black reference area 50 colored in black and a white reference area 51 colored in white are provided. The black reference area 50 is provided outside the white reference area 51, namely, at a side closer to the positioning member 19. As shown in FIG. 4, both reference areas 50 and 51 are belt-shaped members positioned in parallel to the width direction of the device 1, namely, a positioning direction of the document by the positioning member 20. Note that the color of the reference area provided on the guide 47 is not limited to black and white, and various colors can be adopted, such as three primary colors of red, blue, and green, or halftone colors having different lightness. Of course, the number of the reference areas is not limited to two of white and black. In addition, the color of the reference area is not limited to a monochromatic color, and the reference area, in which a plurality of drawing patterns such as a crosshatched pattern and a stripe pattern are applied, may be adopted. In short, the reference area may have any color or drawing pattern, provided that the border position between the document and the reference area can be discriminated from an output signal of the CIS 67 of the image reading unit 61, in a border position detecting process as will be described later. Note that the aforementioned color or drawing pattern for the reference area is constructed as a pattern for the reference area of the present invention.

Width d2 of the guide 47 as shown in FIG. 6 is set smaller than the width of the area set as an area outside the image forming area, and set at substantially about 3 mm. When the image of the document is read, an edge portion around the document might be read as a black frame image. Such a black frame image is generally discarded and deleted during image processing. The area thus read and discarded is the area corresponding to so-called an area outside the image forming area. In the first embodiment, the guide 47 is provided in the area outside the image forming area. Thus, when the image on a semi-transparent or transparent sheet is read, and even if the black reference area 50 is read by show-through, the image data for the black reference area 50 is consequently deleted. As described above, the black reference area 50 is provided outside the white reference area 51 because it is necessary to completely prevent the image data for the black reference area 50 read by show-through from being processed to form an image. Note that in order to simplify an explanation, widths of the guides 46 and 47 are indicated exaggeratedly in FIG. 4, FIG. 5, and FIG. 6.

Figure 3:
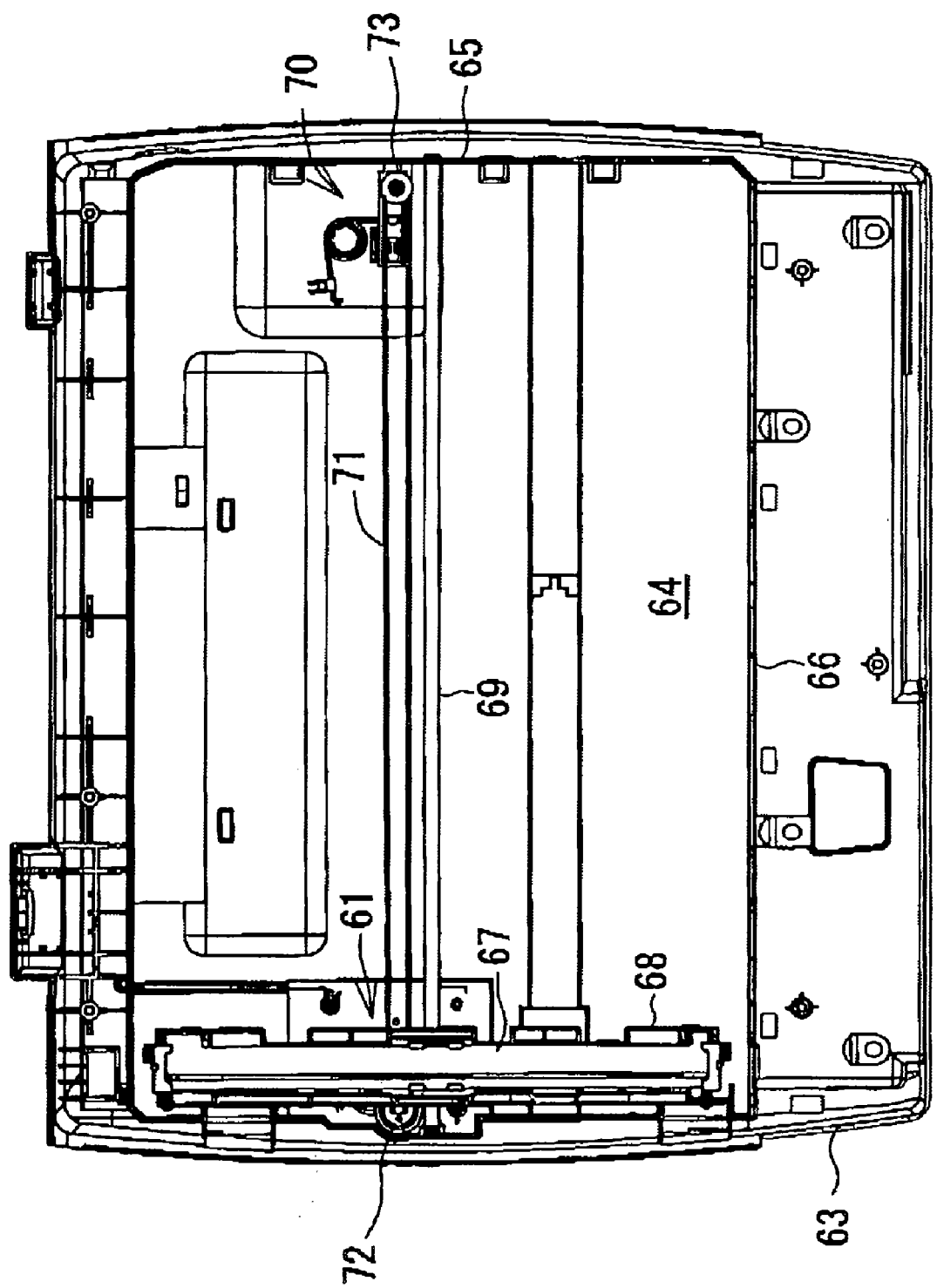
FIG. 3 is a plan view showing an internal constitution of a document table.

Next, an internal configuration of the document table 5 will be explained. As shown in FIG. 3, the image reading unit 61 is arranged inside of the document table 5, so as to face the contact glasses 12 and 13. Note that FIG. 3 is a plan view of the document table 5. However, for convenience of explanation, in FIG. 3, the document cover 7 is omitted.

With reference to FIG. 3, the internal configuration of the document table 5 will be explained hereunder. The body frame 63, which is the casing of the document table 5, is formed of synthetic resin. The image reading unit 61 is arranged in this body frame 63. A base portion 64 constituting a bottom plate, a side wall 65 rising from a circumference of the base portion 64, and a partition plate 66 partitioning off a portion where the image reading unit 61 is disposed and a portion where a substrate, etc, of an operation panel 9 is disposed, are integrally formed in the body frame 63. In addition, in the body frame 63, support ribs for supporting the contact glasses 12 and 13, bosses for screwing each kind of member, and through holes, etc, for electrical wiring, etc, are provided. However, their positions are suitably designed in accordance with the embodiment of the document table 5, and therefore a detailed explanation is omitted.

The image reading unit 61 includes the CIS (Contact Image Sensor) 67 as an example of a light receiving unit, a carriage 68, a guide shaft 69, and a belt driving mechanism 70. The CIS 67 is an image sensor, with the depth direction of the multi-function device 1 defined as the main-scanning direction. Specifically, the CIS 67 is a so-called contact type line image sensor that causes a light source to emit light to the contact glass 12 on which the document is placed and guides by a lens, the reflected light from the document, the document pressing member 16, and the aforementioned guides 46 and 47 (see FIG. 4), etc, to the photo detector (photoelectric conversion element). The photo detector outputs an electric signal in accordance with an intensity (luminance or quantity) of the reflected light. As described above, the A4 size is the maximum size of the document that can be read by the scanner unit 3. Accordingly, when the document is placed, with the reference point 18 set as a reference, the document is principally not placed on a margin area 52 (see FIG. 4) of the contact glass 12 not covered with the document thus placed. However, in the first embodiment, the CIS 67 is also arranged below the margin area 52. Therefore, the image of the opposing surface 49 of the guide 46 provided in this margin area 52 can be read by the CIS 67. Note that, in FIG. 4, for convenience of explanation, the width of the margin area 52 is indicated magnifyingly.

The CIS 67 moves reciprocally below the contact glass 12, in a state of being mounted on the carriage 68. The carriage 68 is engaged with the guide shaft 69 which is hung across over the width direction of the body frame 63. Accordingly, the carriage 68 is driven by the belt driving mechanism 70, and moves so as to slide on the guide shaft 69. By the movement of the carriage 68 on the guide shaft 69, with the CIS 67 mounted on the carriage 68 in a contact state with the contact glass 12, the CIS 67 moves in parallel to the contact glass 12.

The belt driving mechanism 70 is so constituted that an endless circular timing belt 71 having teeth on its inside is wound around a driving pulley 72 and a driven pulley 73 each being provided on both end portions in the width direction of the device 1. A drive force is inputted to a shaft of the driving pulley 72 from a carriage motor 111 (see FIG. 7). By a rotation of the driving pulley 72, the timing belt 71 moves circumferentially. A stepping motor is used as the carriage motor 111. Accordingly, a conveyance distance of the CIS 67 by the belt driving mechanism 70 can be measured by monitoring the number of steps of the carriage motor 111. Note that the timing belt 71 is not limited to the endless circular type, but may be constituted so as to firmly fix the both ends of an ended belt to the carriage 68.

When the scanner unit 3 is used as the FBS, the document is placed on the contact glass 12, with the document cover 7 opened, and thereafter, the document is fixed on the contact glass 12, with the document cover 7 closed. In this state, when a reading instruction is inputted from the operation panel 9, etc, the belt driving mechanism 70 is activated, thereby moving the CIS 67 so as to slide on the guide shaft 69. Then, the CIS 67 emits light onto the document placed on the contact glass 12 while sliding on the guide shaft 69, receives the reflected light from the document, and converts the light thus received to the electric signal. The electric signal thus converted is read as the image data of the document.

When not operated, the scanner unit 3 thus constituted is set in a stand-by mode below the center line Q1 (see FIG. 4) of the black reference area 50 of the guide 46. This stand-by position will be called a home position of the CIS 67 hereafter. In addition, when a document image is read while the document is conveyed by the ADF 6, the CIS 67 moves below the contact glass 13. Also, when the image of the document placed on the contact glass 12 is read by the FBS, the CIS 67 moves to a position below the positioning member 19 and acquires a predetermined reference data. Thereafter, the CIS 67 moves to the position (referred to as "reading start position" hereunder) Q0 below a left end portion of the contact glass 12.

Note that in the first embodiment, an explanation is given to a case in which the image reading unit 61 including the CIS 67 is applied to the scanner unit 3. However, instead of the CIS 67, for example, the image reading unit including an image sensor such as a CCD (Charge Coupled Device) or a CMOS (Complementary Metal-Oxide Semiconductor) can be applied to the scanner unit 3.

Further, in the first embodiment, the scanner unit 3 is not only used as the FBS, but adopts a constitution capable of reading the image data of the document while the document is moved in the sub-scanning direction by the ADF 6. However, the ADF 6 is an optional element, and when the scanner unit 3 is realized as a constitution of reading the image by only the FBS, the ADF 6 and the contact glass 13 become unnecessary.

Figure 7:
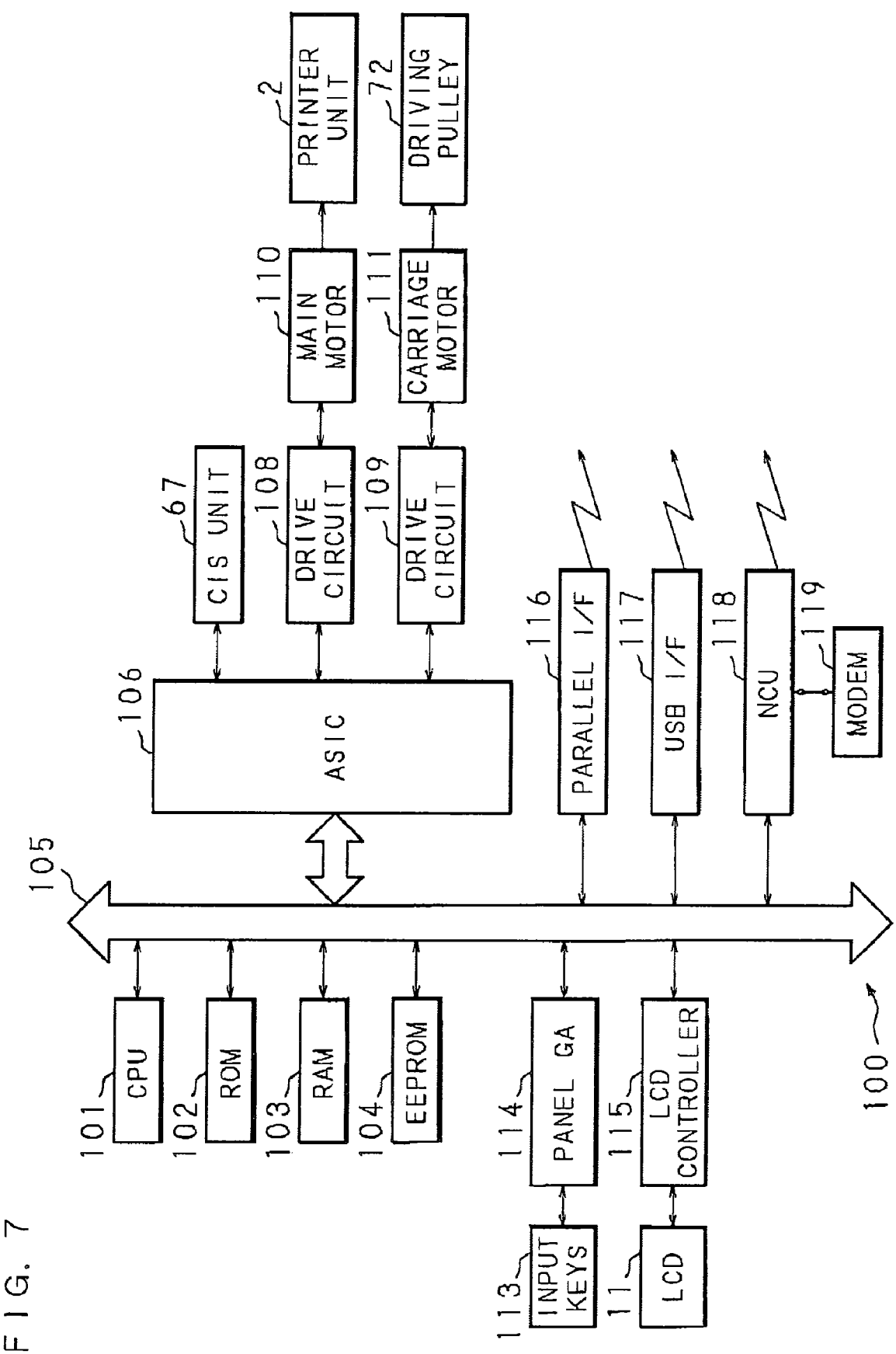
FIG. 7 is a block diagram showing a schematic constitution of a control unit for controlling an operation of the multi-function device.

Next, the control unit 100 for controlling an operation of the multi-function device 1 will be explained with reference to a block diagram of FIG. 7 showing its schematic configuration.

As shown in FIG. 7, the control unit 100 is constituted as a micro computer including a CPU (Central Processing Unit) 101, a ROM (Read Only Memory) 102, a RAM (Random Access Memory) 103, and an EEPROM (Electrically Erasable and Programmable ROM) 104, and is connected to an ASIC (Application Specific Integrated Circuit) 106 through a bus 105.

In the ROM 102, a program for controlling the operation of each element configuring the multi-function device 1 is stored. Also, in the EEPROM 104, each kind of data is stored, which is used when the CPU 101 executes the processing in accordance with the program. The RAM 103 is used as a storage area for temporarily storing each kind of data used for the CPU 101 to execute the program, and as a development area of the data and the program.

The CPU 101 generally controls peripheral control devices constituting the control unit 100, or devices to be controlled by the control unit 100. The CPU 101 reads the program stored in the ROM 102, and the data stored in the RAM 103 or EEPROM 104, to thereby perform arithmetic operation following the program. Thus, the CPU 101 executes control of drive devices such as a motor, image processing, or size calculation processing for calculating the size of the document by following a processing procedure shown in the flowchart (see FIG. 8, FIG. 9 and FIG. 16) as will be described later. The CPU 101 executing the aforesaid processing functions as a border position detecting unit and a size determination unit of the present invention. Note that in the first embodiment, by executing the processing by following a predetermined program by the CPU 101, the present invention is embodied, and based on this concept, the explanation is given. However, for example, the processing executed by the CPU 101 is configured by a hard logic circuit such as an ASIC, and whereby the present invention can also be realized.

Drive circuits 108 and 109 are connected to the ASIC 106. The ASIC 106 generates a phase excitation signal, etc, for supplying power to each of a main motor 110 of the printer unit 2 and a carriage motor 111 of the scanner unit 3, by following an instruction from the CPU 101. The signal thus generated is given to the drive circuits 108 and 109 of the main motor 110 and the carriage motor 111. By supplying a drive signal to the main motor 110 and the carriage motor 111 through the drive circuits 108 and 109, rotation control of each motor is performed.

The drive circuit 108 functions to drive the main motor 110 connected to the devices of driving system such as a paper feed roller provided in the printer unit 2. The drive circuit 108 generates the electric signal for rotating the main motor 110, by receiving an output signal from the ASIC 106. When the main motor 110 that receives the electric signal thus generated is rotated, the rotational force of the main motor 110 is transferred to the aforesaid devices of driving system through the belt driving mechanism constituted by gears and belts, thereby driving an overall printer unit 2. Thus, it becomes possible to perform operations such as conveying recording paper from a recording paper cassette, driving an ink jet recording head, and discharging the recording paper.

The drive circuit 109 functions to drive the carriage motor 111 connected to the driving pulley 72 of the scanner unit 3. The drive circuit 109 generates the electric signal for rotating the carriage motor 111 by receiving the output signal from the ASIC 106. When the carriage motor 111 that receives the electric signal thus generated is rotated, the rotational force of the carriage motor 111 is transferred to the driving pulley 72 from its rotation shaft, and the driving pulley 72 is finally rotated.

The CIS 67 constituting the image reading unit 61 is connected to the ASIC 106. By the ASIC 106, the electric signal for emitting light from the light source and a timing signal for outputting the image data from the photoelectric conversion element are given to the CIS 67, based on the instruction from the CPU 101. The CIS 67 receives these signals and thereby emits light to the document at a predetermined timing, and outputs the image data obtained by converting the reflected light by the photoelectric conversion element.

To the bus 105, a panel gate array (panel GA) 114 for controlling each kind of input key 113 such as a start button 74 and stop button 75 arranged on the operation panel 9 of the multi-function device 1 is connected. The panel gate array 114 outputs a predetermined code signal when pressing of the input key 113 is detected. A unique key code is assigned to each input key 113. When the CPU 101 receives a code signal indicating a predetermined key code from the panel gate array 114, it performs a control processing to be executed, by following a predetermined key processing table. The key processing table is a table in which the key codes and the control processing are corresponded to each other, and is stored in the EEPROM 104, for example.

Also, to the bus 105, an LCD controller 115 for controlling an image display of the liquid crystal display 11 is connected. Based on the instruction from the CPU 101, the LCD controller 115 causes the liquid crystal display 11 to display on a screen the information on the operation of the printer unit 2 or the scanner unit 3, error information, and setting information, etc.

Also, to the bus 105, a parallel interface 116 and an USB interface 117 for performing reception/transmission of data through a parallel cable or USB cable between computers not shown are connected. Further, to the bus 105, an NCU (Network Control Unit) 118 and a MODEM 119 for realizing a facsimile function are connected.

Figure 8:
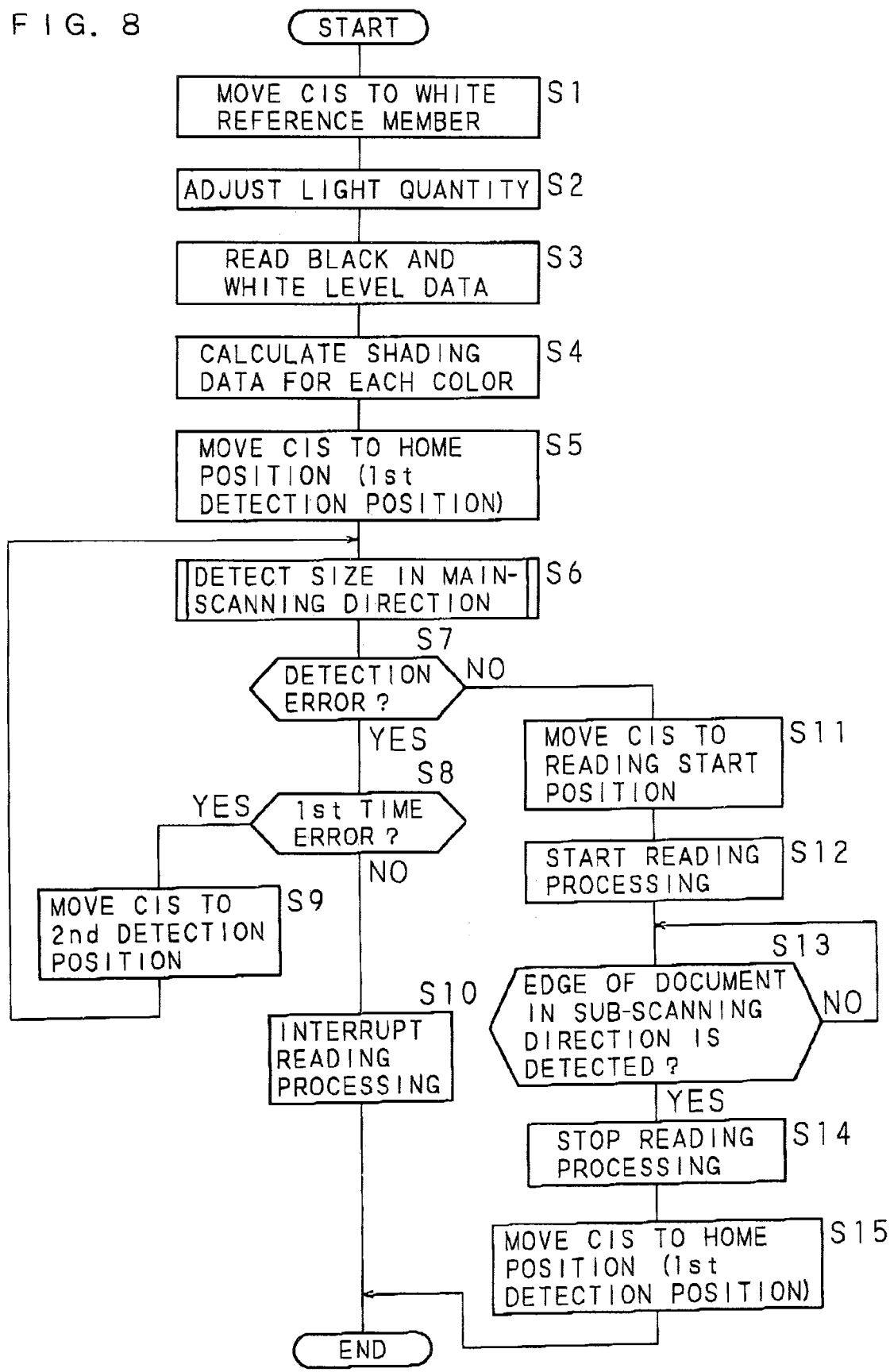
FIG. 8 is a flowchart for explaining an example of a procedure of a calculation process of a document size.
Figure 9:
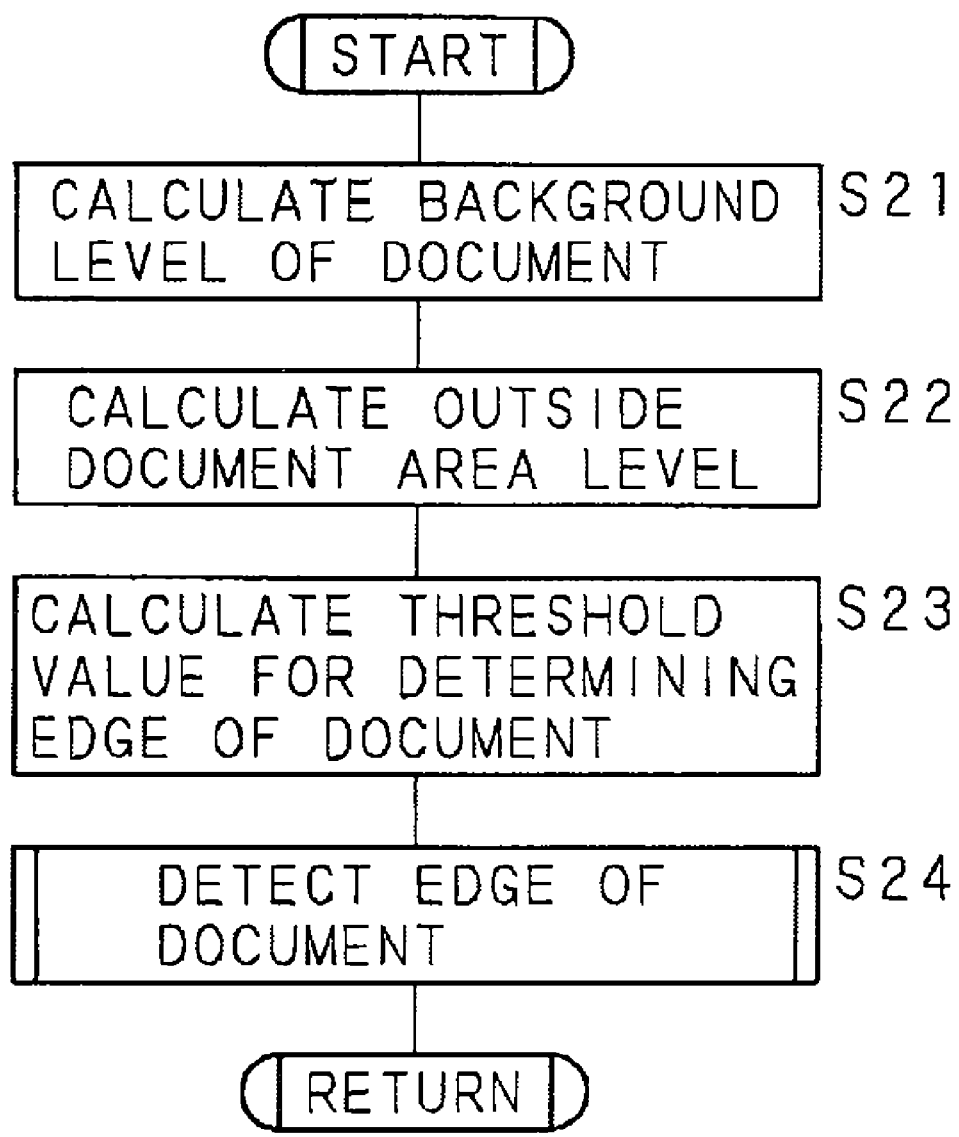
FIG. 9 is a flowchart for explaining an example of the procedure of a document size calculation process applied to a document length in a main-scanning direction.

In the multi-function device 1 of the first embodiment thus configured, when the reading instruction of the document is inputted, in a state of a scanner mode or a copy mode being set, the size calculation processing for calculating the size of the document placed on the contact glass 12 is executed by the CPU 101, in addition to a normal reading processing of a document image. Hereunder, an explanation will be given to an example of the procedure of the size calculation processing executed by the CPU 101, with reference to the flowcharts of FIG. 8 or FIG. 9. Note that S1, S2, . . . in FIG. 8 and FIG. 9 show the number of the processing procedures (steps). The processing is started from step S1. Note that FIG. 10 to FIG. 14 are referred to for explaining the processing procedure. In addition, FIG. 10 to FIG. 14 are graphs schematically showing the received light quantity distribution in the main-scanning direction of the reflected light read by the CIS 67.

When the start button 74 of the operation panel 9 is pressed down by a user, the image reading processing of the document is started in the scanner unit 3. However, first, the document S of A4 size is placed in a landscape direction on the contact glass 12 as shown in FIG. 4, before the start button 74 is pressed down. Namely, the document S is placed on the contact glass 12, so that one corner of the document S coincides with the reference point 18, and further two side edges, which contain the corner coinciding with the reference point 18, of the document S are pressed against the positioning members 19 and 20.

When the start button 74 is pressed down, in step S1, first, by outputting the instruction by the CPU 101, the carriage motor 11 is rotated. Thus, the CIS 67 starts to move for acquiring the white reference data. Specifically, the CIS 67 moves from the predetermined home position Q1 (see FIG. 4) in the document table 5, to a position below the white reference member 21 provided on the backside of the positioning member 19.

In step S2, a light quantity adjustment is performed for the white reference member 21. Specifically, the light is emitted to the white reference member 21 by a sufficiently small light quantity, from the light source of the CIS 67, and the reflected light is received by the photo detector of the CIS 67. When the light quantity of the light source is small, naturally, the output of the photo detector becomes also small. The light quantity of the light source of the CIS 67 is increased step by step or continuously until the output of the photo detector reaches a predetermined value, and the light quantity of the light source at the time point when the output of the photo detector reaches the predetermined value is stored in the RAM 103 as an adjustment value.

When a light quantity adjustment as described above is ended, subsequently, in step S3, the processing of acquiring the black reference data and the white reference data is performed. First, the output of the photo detector is acquired for a plurality of times in a state that the light source of the CIS 67 is turned off, and an average value of the output values thus acquired is calculated by the CPU 101. The average value thus calculated is stored in the RAM 103 as the black reference data. Next, the light is emitted to the white reference member 21 from the light source of the CIS 67 with a light quantity adjusted in step S2, and the reflected light is received by the photo detector of the CIS 67. Thus, the white reference data is acquired. The white reference data thus acquired is stored in the RAM 103.

As described above, when the white reference data and the black reference data are acquired, in step S4, shading data of black color is created by using the black reference data thus acquired in step S3, and further the shading data of white color is created by using the white reference data acquired in step S3 by the CPU 101. The shading data of each color thus created is stored in the RAM 103. The shading data of each color thus created is used for a shading correction of the image signal. In addition, the shading data stored in the RAM 103 is updated every time new shading data is created.

As described above, when the light quantity adjustment (step S2) and acquisition of the shading data (step 4) are ended, in step S5, the instruction is outputted by the CPU 101 to the drive circuit 109 through the ASIC 106, and the carriage motor 111 is rotated. Thus, the CIS 67 is returned to the home position Q1 (first detection position).

When the CIS 67 is returned to the home position Q1, namely, in the portion below the black reference area 50 of the guide 46, subsequently, in step S6, the size detection processing in the main-scanning direction is executed. The processing in this step S6 is the processing for detecting a length of the document S placed on the contact glass 12 in the main-scanning direction, and executed by the CPU 101 by following the procedure as shown in the flowchart of FIG. 9 as a sub-routine.

First, in step S21, a background level of the document S is calculated. Specifically, the CIS 67 emits light to the document S at the home position Q1, and the reflected light is received by the photo detector. Since the CIS 67 is provided over an entire length of the contact glass 12 in the main-scanning direction, the photo detector can acquire light quantity distribution over the range of an entire area in the main-scanning direction. The light quantity distribution thus acquired is stored in the RAM 103, and is used for the processing from step S22 to step S24 as will be described later.

Next, based on the light quantity distribution thus acquired, the average value of the received light quantity in a range (see FIG. 4) of the area 53 (referred to as "document background area" hereafter) from the reference point 18 to a predetermined distance in the main-scanning direction is calculated by the CPU 101. The average value thus calculated is stored in the RAM 103 as a background level of the document S. Note that the aforementioned document background area 53 corresponds to the size of the minimum size frame 22 (shown by a broken line frame in FIG. 4) in the main-scanning direction, which is a placing area of the document of minimum size that can be read by the scanner unit 3. In a case of the received light quantity of the reflected light from the aforementioned document background area 53, all the reflected light corresponds not to the reflected light from the backside of the guide 46, but to the reflected light from the document.

Subsequently, in step S22, an outside document area level is calculated by the CPU 101. Specifically, by referring to the received light quantity distribution over the range of the entire area in the main-scanning direction of the home position Q1 acquired in step S21, the average value of the received light quantity in the aforementioned margin area 52 (see FIG. 4) is calculated. The average value thus calculated is stored in the RAM 103 as the outside document area level of the document S.

In step S23, based on the document background level calculated in step S21 and the outside document area level calculated in step S22, a threshold value for determining the edge of the document S in the main-scanning direction is calculated. Specifically, the document background level and the outside document area level stored in the RAM 103 are read by the CPU 101, and an arithmetic means of each level is calculated. For example, when the background color of the document S is white, a difference between the document background level and the outside document area level is relatively large. Therefore, an intermediate value by which either of the levels can be discriminated is calculated as the threshold value. For example, when the value obtained by converting the light quantity of the reflected light from the white background of the document S into 8-bit gradation is "255", and the value obtained by converting the light quantity of the reflected light from the black reference area into 8-bit gradation is "0", the intermediate value thereof "128" is calculated as the threshold value. Meanwhile, when the background color of the document S is black, both of the document background level and the outside document area level are "0" in the 8-bit gradation, and therefore an inappropriate value "0" as the threshold value is calculated. Note that the threshold value calculated in step S23 is stored in the RAM 103.

As described above, when the threshold value for determining the edge (corresponding to the border position) of the document is calculated, subsequently, in step S24, the processing of detecting the edge of the document S in the main-scanning direction of the document S is performed by the CPU 101. For example, when the background color of the document S is white, in step S21, the received light quantity distribution shown in the graph of FIG. 10 is acquired. Note that in FIG. 10, the length from the reference point 18 to the main-scanning direction is taken on the abscissa axis, and the received light quantity expressed by 8-bit gradation is taken on the ordinate axis. P0, P1, P2 . . . on the abscissa axis correspond to the positions of P0, P1, P2, . . . as shown in FIG. 4. At this time, as described in step S23, when the threshold value "128" is calculated, it is possible to determine the position of P1 as the edge of the document, by obtaining a change point of the received light quantity from the received light quantity distribution of FIG. 10, with the threshold value "128" set as a reference. Namely, it is so detected that the position of P1 is the edge of the document. Thus, when the edge of the document is detected, from a relation between the length of a platen glass 12 in the main-scanning direction and the received light quantity distribution shown in FIG. 10, the length of the document S in the main-scanning direction can be obtained by calculating the distance from the reference point 18 (position of P0) to the position of P1. The length thus obtained (the length of the document S in the main-scanning direction) is stored in the RAM 103.

Figure 11:
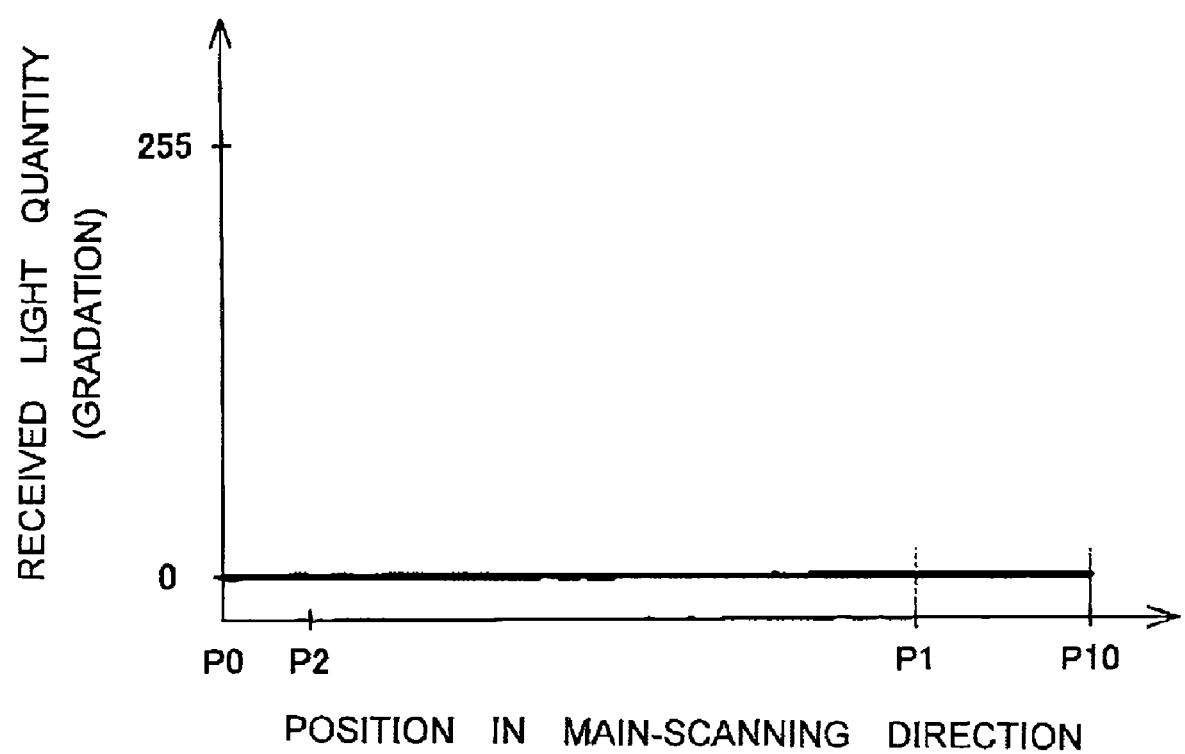
FIG. 11 is a graph schematically showing the received light quantity distribution in the main-scanning direction of the read reflected light.

Meanwhile, when the background color of the document S is black, in step S21, the received light quantity distribution as shown in FIG. 11 is acquired. In this case, there is no difference between the threshold value calculated in step S23 and the received light quantity. Accordingly, the edge of the document S can not be detected, resulting in allowing a detection error to occur. Such a detection error is judged by determining whether or not there is a predetermined difference between the document background level calculated in step S21 and the outside document area level calculated in step S22. In addition, when the detection error has occurred, error information is stored in the RAM 103. Thus, when a main-scanning size detection process from step S21 to step S24 is ended, the next processing is returned to step S7 of FIG. 8.

In step S7, it is determined whether or not the error has occurred in the main-scanning size detection process in step S6. Here, when the detection error is determined to have occurred, it is determined whether or not the error has occurred for the first time (step S8). When the error has occurred for the first time, the CIS 67 is moved by an instruction outputted from the CPU 101 to a second detection position Q2, namely, below the center line of the white reference area 51 of the guide 46 by the carriage motor 111 (step S9). Thereafter, the processing is returned to step S6 again, and the processing after step S6 is repeatedly executed. In step S6, the processing of step S21 to step S24 as shown in FIG. 9 as the sub-routine is executed. It is assumed that the background color of the document S in the above case is a color of low lightness (such as black color). Accordingly, by assuming that the background color of the document S is black, the received light quantity as shown in the graph of FIG. 12 is obtained. Meanwhile, in step S8, when it is judged that the detection error has occurred for the second time (in a case of NO in step S8), reading processing is interrupted (step S10), and a series of processing is ended, while the document size is not calculated.

Figure 14:
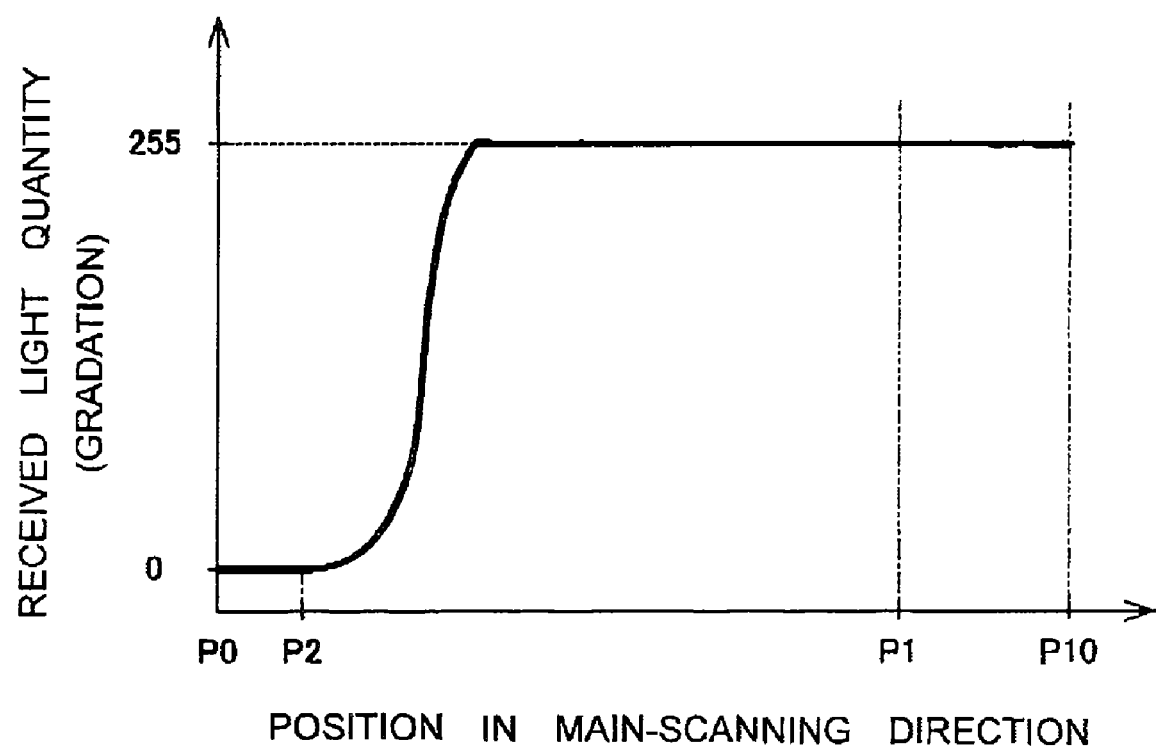
FIG. 14 is a graph schematically showing the received light quantity distribution in the main-scanning direction of the read reflected light.

In step S7, when it is determined that the detection error has not occurred, namely, the length of the document S in the main-scanning direction is obtained in step S6 (in a case of NO in step S7), subsequently, the CIS 67 is moved to a reading start position Q0 (see FIG. 4) in step S11. Thereafter, the CIS 67 is moved in the sub-scanning direction while reading the image in the main-scanning direction of the document S (step S12). The received light quantity distribution thus read by the CIS 67 at a position of Q3 and Q4 as shown in FIG. 4 is shown in FIG. 13 and FIG. 14. Note that FIG. 13 shows the received light quantity distribution of the reflected light from the area in which the document S with white background color exists, and FIG. 14 shows the received light quantity distribution of the reflected light from the area in which the document S with white background color does not exit.

In step S13, based on the received light quantity distribution read by the photo detector of the CIS 67, the detection process of the edge of the document in the sub-scanning direction is executed. Specifically, this process is executed by monitoring the change of the received light quantity of the range from P0 point to P2 point, with the threshold value calculated in the aforementioned step S83 (see FIG. 9) and stored in the RAM 103 set as a reference. For example, when the received light quantity of the area from the P0 point to the P2 point changes from "255" as shown in FIG. 13 to "0" as shown in FIG. 14, the position of the CIS 67 in the sub-scanning direction is obtained. In addition, as described above, the position of the CIS 67 can be obtained from the number of steps of the carriage motor 111. Thus, the position of the edge of the document S in the sub-scanning direction is detected, and therefore the length of the document S in the sub-scanning direction is detected.

In the aforementioned step S13, when the edge of the document S is detected, the CPU 101 stops a useless reading processing thereafter (step S14), and makes the CIS 67 move to the home position Q1 which is an original position.

As described above, in step S6, even when the size of the document S in the main-scanning direction can not be detected, the CIS 67 is moved to the second detection position Q2 and the reference area is changed from the black reference area 50 to the white reference area 51, and thereafter, the processing of detecting the size of the document S in the main-scanning direction is performed. As a result, it becomes possible to accurately detect the border position between the reference area and the document S, namely, the position of the edge of the document. Accordingly, a detection accuracy of the border position between the reference area and the document S is improved, thereby also improving the accuracy of calculation of the document size. In addition, both of the lengths of the document S in the main-scanning direction and the sub-scanning direction are measured, and therefore it becomes possible to calculate the size of the document, even if the document is not a standard size.

Second Embodiment

Next, a second embodiment of the present invention will be explained. The second embodiment has substantially the same configuration as that of the aforementioned first embodiment. Accordingly, the same reference numerals are assigned to the element common to the configuration of the first embodiment, and the explanation therefore is omitted. The second embodiment is different from the first embodiment, roughly in the point that guides 55 and 56 are provided only in the main-scanning direction of the contact glass 12, in the point that a standard size correspondence list as shown in table 1 is stored in the EEPROM 104, and in the point that a size calculation processing is performed by the CPU 101 by following the flowchart shown in FIG. 16.

TABLE 1

| Main-scanning directional size | Placing direction of document | |
| --- | --- | --- |
| | Landscape | Portrait |
| 105 | A6 [105 × 148] | A7R [105 × 74] |
| 148 | A5 [148 × 210] | A6R [148 × 105] |
| 182 | B5 [182 × 257] | B6R [182 × 128] |
| 210 | A4 [210 × 297] | A5R [210 × 148] |
| 257 | (B4 [257 × 364]) | (B5R [257 × 182]) |
| 297 | (A3 [297 × 420]) | (A4R [297 × 210]) |

In table 1, standard sizes each corresponding to the length of the document in the main-scanning direction that can be placed on the contact glass 12 are classified for each placing direction of the document. According to the standard size correspondence list, when the length in the main-scanning direction is 210 mm and the placing direction is landscape direction, it can be easily determined that the document is A4 size, and when the length in the main-scanning direction is 210 mm and the placing direction is portrait direction, it can be easily determined that the document is A5R size. Such a standard size correspondence list is used in a document size determination processing of step S32 of the flowchart of FIG. 16 as will be described later. Note that the EEPROM 104 storing the aforementioned standard size correspondence list functions as a standard size information storage unit of the present invention.

Figure 15:
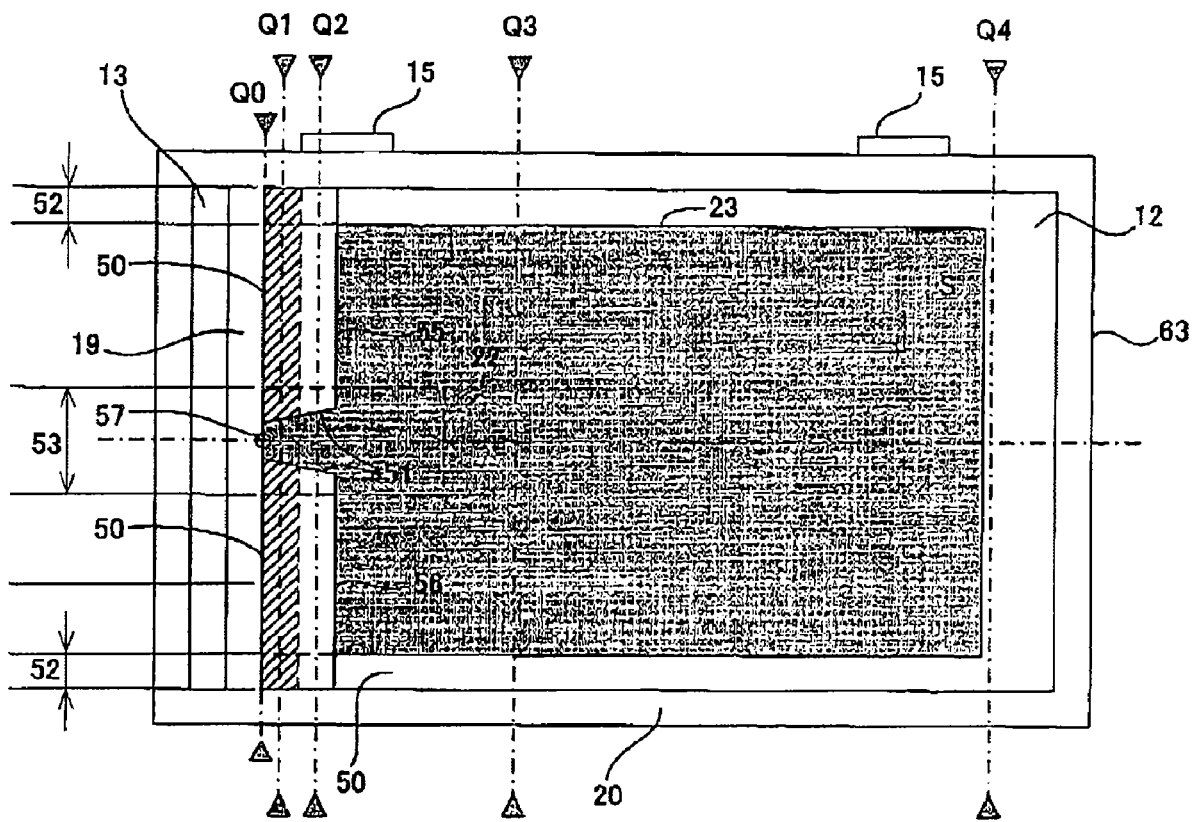
FIG. 15 is a plan view showing an arrangement state of the contact glass arranged on the upper surface of the document table of a second embodiment.

In the multi-function device 1 of the second embodiment, as shown in FIG. 15, the document is placed, with the center of the document coinciding with a center position 57 of the left end portion of the contact glass 12. FIG. 15 is a plan view showing an arrangement state of the contact glasses 12 and 13 arranged on the upper surface of the document table 5. Accordingly, on the upper surface of the positioning member 19, the center position and both end positions of each kind of document size (A4 (210×297 mm), B5 (182×257 mm), A5 (148×210 mm), etc.) are marked. In addition, in the second embodiment, the document S is positioned by only the positioning member 19, and therefore the positioning member 20 in the sub-scanning direction provided in the first embodiment is not necessary.

As shown in FIG. 15, on the contact glass 12, divided guides 55 and 56 are arranged, so as to extend only in the main-scanning direction. The divided guides 55 and 56 are divided into the divided guide 55 on the depth side of the apparatus, and the divided guide 56 on the front side of the apparatus, with the center position 57 in the main-scanning direction set as a center. As shown in FIG. 15, the divided guides 55 and 56 are not provided in the vicinity of the center position 57. This is because whether or not the document is placed on the contact glass 12 is detected by detecting the presence/absence of the edges of the divided guides 55 and 56. Also, in the same way as the aforementioned first embodiment, in the second embodiment, the divided guides 55 and 56 are provided so as to intersect with the minimum size frame 22 and with the maximum size frame 23, and extend to the outside of the maximum size frame 23. Note that the sectional configurations of these divided guides 55 and 56 are the same as the guides 46 and 47 of the aforementioned first embodiment, and therefore FIG. 6 showing the sectional configurations thereof is to be referred to.

Figure 16:
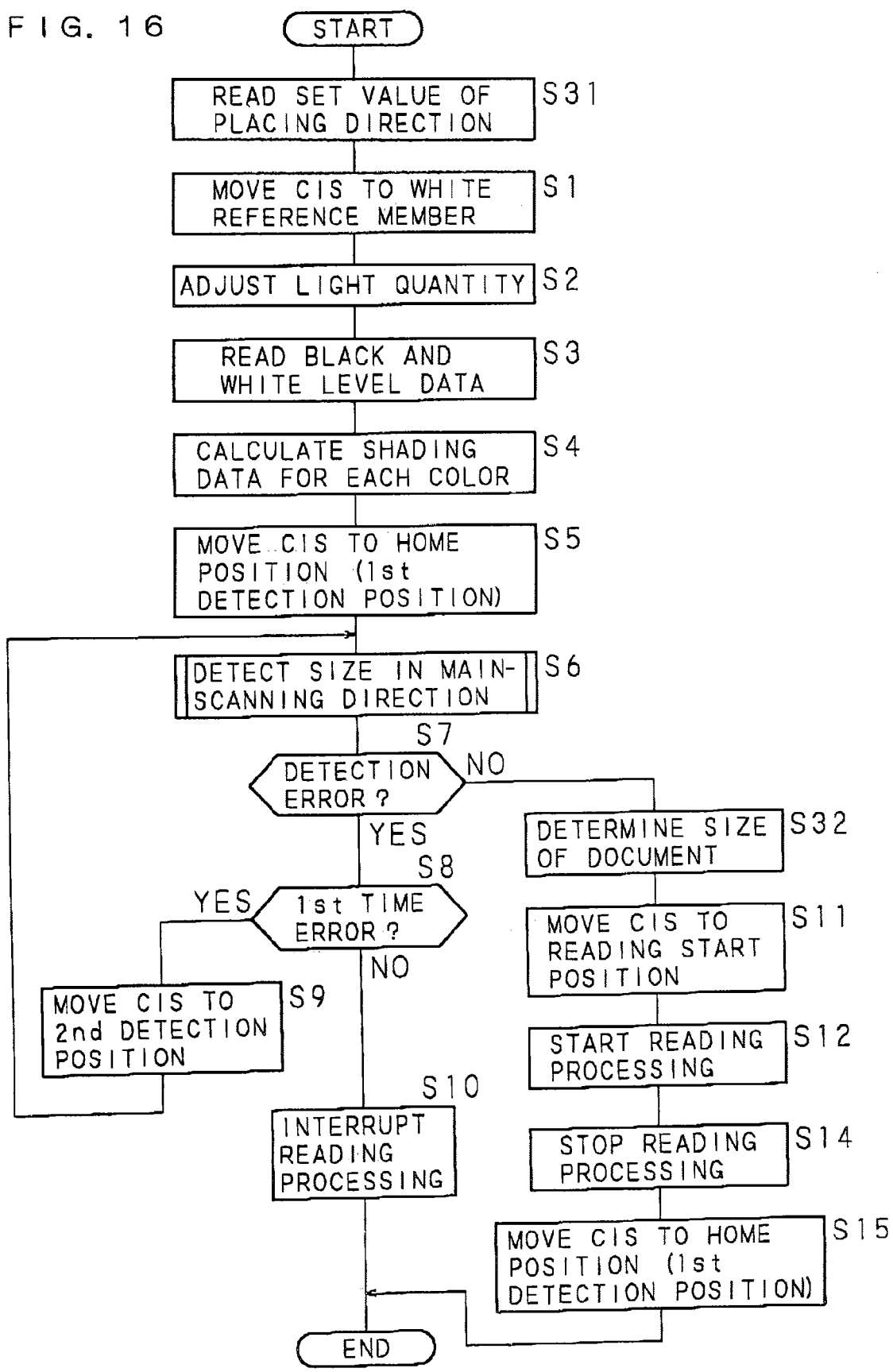
FIG. 16 is a flowchart for explaining an example of the procedure of a document size calculation process of the second embodiment.

Hereunder, an explanation is given to the procedure of the size calculation processing executed by the CPU 101 in the second embodiment, with reference to the flowchart of FIG. 16. The processing is started from step S31. Note that in FIG. 16, the same step number is assigned to the same processing procedure as the processing procedure of the flowchart of FIG. 8 in the aforementioned first embodiment, and a detailed explanation therefore is omitted.

In the second embodiment, before the user presses down the start button 74, the user previously inputs from the operation panel 9 the placing direction of the document S, namely, whether the document is placed in the landscape direction or the portrait direction on the contact glass 12. Accordingly, as described above, the liquid crystal display 11 and ten-key pad 77, etc, realizing such a setting input correspond to a document placing direction input unit of the present invention.

The placing direction of the document S thus inputted is stored in the RAM 103 as a set value. Note that when the placing direction of the document is not inputted beforehand, the landscape direction is default as the placing direction of the document S. Accordingly, the user may input to give an instruction that the placing direction of the document S is portrait direction only when the document S is placed in the portrait direction.

When the document S is placed on the contact glass 12, and the start button 74 is pressed down, in step S31, the set value of the placing direction of the document S is read from the RAM 103. Thereafter, by following the procedure of step S1 to step S5 common to the first and the second embodiments, the CPU 101 moves the CIS 67 to the position of the white reference member 21 (step S1), performs light quantity adjustment (step S2), acquires black and white level data (step S3), calculates each color shading data based on the acquired level data (step S4), and thereafter moves the CIS 67 to the home position (first detection position) Q1 (step S5). Then, in step S6, in the same way as the case of the first embodiment, the length of the document S in the main-scanning, direction is detected.

When the length of the document S in the main-scanning direction is detected (step S6) and the detected value is determined not to be error (in a case of NO in step S7), the processing is advanced to step S32, and the processing of determining the size of the document S is executed. Specifically, the standard size correspondence list as shown in table 1 is read from the EEPROM 104. Then, the standard size defined by the placing direction read in step S31 and the length in the main-scanning direction detected in step S6 are extracted from the read standard size correspondence list by the CPU 101. For example, when the landscape direction is set and input as the placing direction of the document, and the length of the document S in the main-scanning direction is calculated to be 210 mm, A4 size is extracted from the standard size correspondence list as shown in table 1. Note that in the second embodiment, the maximum document size that can be read in the scanner unit 3 is A4, and therefore the document up to A4 size and A5R size can be determined. Of course, when the scanner unit capable of reading the document of large size is provided, it is needless to say that the size shown by "( )" in table 1 such as B4, B5R, A3, and A4R can also be determined.

In step S32, when the size of the document S is determined, the processing of step S11 to step S15 is executed in the same way as the case of the aforementioned first embodiment, and a series of the processing is ended. Note that in step S7, the processing after determining that a calculation error has occurred in step S7, is the same as the processing of the first embodiment) and therefore the explanation is omitted.

Thus, by using the standard size correspondence list of table 1, the size of the document S can be detected, even if the received light quantity distribution in the main-scanning direction is not monitored all the time over the range in the sub-scanning direction, as long as the document has the standard size. As a result, the throughput of size detection processing is improved, and a detection time is shortened.

It should be noted that the aforementioned first and second embodiments are only an example of the present invention, and needless to say, each embodiment can be suitably modified in a range not departing from the gist of the present invention.

According to the present invention as described above, two reference areas of predetermined patterns are provided in the reference area holding member, and therefore the border position between at least one of the reference areas and the document can be accurately detected. Accordingly, the detection accuracy of the border position can be improved, thus also improving the accuracy of calculation of the document size.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. An image reading apparatus that reads an image in a first scanning direction and in a second scanning direction perpendicular to the first scanning direction, the image reading apparatus comprising:

a document table that has a placing surface on which a document is placed;

a first positioning member that is provided on the document table to extend in the first scanning direction and determines a position in the second scanning direction of an edge of the document placed on the placing surface;

a light receiving unit that is provided to face one surface of the document placed on the placing surface, and receives reflected light of light emitted to the placing surface;

a first reference area holding member that extends from the first positioning member over the placing surface and holds, on its surface opposing the placing surface, two reference areas extending parallel to the first scanning direction and including a first reference area and a second reference area each having a different pattern from each other;

a border position detecting unit that detects a border position in the first scanning direction between at least one of the first and second reference areas and the document placed on the placing surface, based on a light quantity of the reflected light received by the light receiving unit; and a size determining unit that calculates a document length in the first scanning direction based on the border position detected by the border position detecting unit.

2. The image reading apparatus as set forth in claim 1, further comprising:

a second positioning member that is provided on the document table to extend in the second scanning direction and determines a position in the first scanning direction of an edge of the document placed on the placing surface; and a second reference area holding member that extends from the second positioning member over the placing surface and holds, on its surface opposing the placing surface, two reference areas extending parallel to the second scanning direction and including a third reference area and a forth reference area, the third reference area having the same pattern as the first reference area, and the fourth reference area having the same pattern as the second reference area;

wherein the border position detecting unit detects a border position in the second scanning direction between at least one of the third and fourth reference and the document placed on the placing surface, based on the light quantity of the reflected light received by the light receiving unit, and the size determining unit calculates a document length in the second scanning direction based on the border position in the second scanning direction detected by the border position detecting unit.

3. The image reading apparatus as set forth in claim 1, further comprising:

a document placing direction input unit that inputs a placing direction of the document placed on the placing surface; and a document size information storage unit that stores a correspondence for each document placing direction between document lengths in the first scanning direction and standard document sizes, wherein the size determining unit refers to the correspondence stored in the document size information storage unit and selects, as a document size, one of the standard document sizes that accords with the calculated document length in the first scanning direction and the inputted document placing direction.

4. The image reading apparatus as set forth in claim 3, wherein the positioning member has a reference point at a center in the first scanning direction, and the document is placed on the placing surface with a center of a document edge coinciding with the reference point.

5. The image reading apparatus as set forth in claim 1, wherein the light receiving unit extends in the first scanning direction along an entire length of the placing surface, and is movable in the second scanning direction.

6. The image reading apparatus as set forth in claim 1, wherein the first reference area holding member is disposed at such an area that is subjected to image reading but image data obtained therefrom is not used for image forming.

7. The image reading apparatus as set forth in claim 1, wherein a predetermined gap is provided between the placing surface and the reference area holding member to receive therein the document, and the first and second reference areas each having a belt shape oppose a back surface of the document placed on the placing surface.

8. The image reading apparatus as set forth in claim 1, wherein the placing surface has a minimum size document placing area and a maximum size document placing area, and the first reference area holding member extends from the minimum size document placing area to an outside of the maximum size document placing area.

9. The image reading apparatus as set forth in claim 1, wherein one of the patterns of the first and second reference areas is white and the other is black.

10. The image reading apparatus as set forth in claim 1, wherein the border position detecting unit detects the border position in the first scanning direction, based on a light quantity distribution in the first scanning direction of the reflected light received by the light receiving unit.

11. The image reading apparatus as set forth in claim 1, wherein the border position detecting unit detects the border position in the first scanning direction by determining whether or not the received light quantity changes across a predetermined threshold value.

12. The image reading apparatus as set forth in claim 1, wherein when the border position detecting unit fails to detect the border position in the first scanning direction, based on the light quantity received from an area where the document is placed between the placing surface and the first reference area, the border position detecting unit attempts to detect the border position based on the light quantity received from an area where the document is placed between the placing surface and the second reference area.

13. The image reading apparatus as set forth in claim 2, wherein when the border position detecting unit has successfully detected the border position in the first scanning direction, based on the light quantity received from an area where the document is placed between the placing surface and one of the first and second reference areas, the border position detecting unit detects the border position in the second scanning direction, based on the light quantity received from an area where the document is placed between the placing surface and one of the third and fourth reference areas that has the same pattern as the one of the first and second reference areas.

14. An image reading apparatus that reads an image in a first scanning direction and in a second scanning direction perpendicular to the first scanning direction, the image reading apparatus comprising:

a document table that has a placing surface on which a document is placed;

a first positioning member that is provided on the document table to extend in the first scanning direction and determines a position in the second scanning direction of an edge of the document placed on the placing surface;

a second positioning member that is provided on the document table to extend in the second scanning direction and determines a position in the first scanning direction of an edge of the document placed on the placing surface;

a light receiving unit that is provided to face one surface of the document placed on the placing surface, and receives reflected light of light emitted to the placing surface;

a first reference area holding member that extends from the first positioning member over the placing surface and holds, on its surface opposing the placing surface, a first reference area extending parallel to the first scanning direction;

a second reference area holding member that extends from the second positioning member over the placing surface and holds, on its surface opposing the placing surface, a second reference area extending parallel to the second scanning direction, wherein the first reference area and the second reference area have a same pattern;

a border position detecting unit that detects a border position in the first scanning direction between the first reference area and the document placed on the placing surface, and a border position in the second scanning direction between the second reference area and the document placed on the placing surface, by determining whether or not a quantity of the reflected light received by the light receiving unit changes across a predetermined threshold value that is commonly used for border detections in the first scanning direction and in the second scanning direction; and a size determining unit that calculates document lengths in the first scanning direction and in the second scanning direction, based on the border positions in the first scanning direction and the second scanning direction detected by the border position detecting unit.

15. The image reading apparatus as set forth in claim 14, wherein the light receiving unit extends in the first scanning direction along an entire length of the placing surface, and is movable in the second scanning direction.

16. The image reading apparatus as set forth in claim 14, wherein the first and second area holding members are disposed at such areas that are subjected to image reading but image data obtained therefrom is not used for image forming.

17. The image reading apparatus as set forth in claim 14, wherein a predetermined gap is provided between the placing surface and the first and second reference area holding members to receive therein the document, and the first and second reference areas each having a belt shape oppose a back surface of the document placed on the placing surface.

18. The image reading apparatus as set forth in claim 14, wherein the placing surface has a minimum size document placing area and a maximum size document placing area, and the first and second reference area holding members extend from the minimum size document placing area to an outside of the maximum size document placing area.

19. A method for detecting a size of a document to be read by an image reading apparatus that reads an image of a document placed on a placing surface of a document table in a first scanning direction and in a second scanning direction perpendicular to the first scanning direction, the method comprising:

determining a position in the second scanning direction of an edge of a document placed on the placing surface by a first positioning member that is provided on the document table to extend in the first scanning direction;

receiving reflected light from the document placed on the placing surface and at least one of first and second reference areas that are provided to extend in the first scanning direction, wherein the document is placed between the placing surface and the first and second reference areas having different patterns from each other;

detecting a border position in the first scanning direction between the document placed on the placing surface and at least one of the first and second reference areas, based on the received light quantity of the reflected light; and calculating a document length in the first scanning direction based on the detected border position.

20. The method as set forth in claim 19, further comprising:

determining a position in the fist scanning direction of an edge of the document placed on the placing surface by a second positioning member that is provided on the document table to extend in the second scanning direction;

receiving reflected light from the document placed on the placing surface and at least one of third and fourth reference areas that are provided to extend in the second scanning direction, wherein the document is placed between the placing surface and the third and fourth reference areas having different patterns from each other;

detecting a border position in the second scanning direction between the document placed on the placing surface and at least one of the third and fourth reference areas, based on the received light quantity of the reflected light; and calculating a document length in the second scanning direction based on the detected border position.

21. The method as set forth in claim 19, further comprising:

inputting a placing direction of the document placed on the placing surface; and referring to document size information including a correspondence, for each document placing direction, between document lengths in the first scanning direction and standard document sizes and selecting, as a document size, one of the standard document sizes in accordance with the calculated document length in the first scanning direction and the inputted document placing direction.

* * * * *